(12) United States Patent
Matsumoto et al.

(10) Patent No.: US 12,095,081 B2
(45) Date of Patent: Sep. 17, 2024

(54) ELECTROLYTIC SOLUTION AND ELECTROCHEMICAL DEVICE

(71) Applicant: MURATA MANUFACTURING CO., LTD., Kyoto (JP)

(72) Inventors: Ryuhei Matsumoto, Kyoto (JP); Yuri Nakayama, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 657 days.

(21) Appl. No.: 17/245,753

(22) Filed: Apr. 30, 2021

(65) Prior Publication Data

US 2021/0265625 A1    Aug. 26, 2021

Related U.S. Application Data

(63) Continuation of application No. PCT/JP2019/042703, filed on Oct. 24, 2019.

(30) Foreign Application Priority Data

Oct. 30, 2018   (JP) ................. 2018-204215

(51) Int. Cl.
| | |
|---|---|
| *H01M 4/38* | (2006.01) |
| *H01M 10/054* | (2010.01) |
| *H01M 10/36* | (2010.01) |
| *H01M 4/02* | (2006.01) |
| *H01M 4/46* | (2006.01) |

(52) U.S. Cl.
CPC ........... *H01M 4/38* (2013.01); *H01M 10/054* (2013.01); *H01M 10/36* (2013.01); *H01M 2004/027* (2013.01); *H01M 2004/028* (2013.01); *H01M 4/466* (2013.01); *H01M 2300/0028* (2013.01)

(58) Field of Classification Search
CPC ...... H01M 4/38; H01M 4/466; H01M 10/054; H01M 10/36
USPC .......................................... 429/325
See application file for complete search history.

(56) References Cited

U.S. PATENT DOCUMENTS

2013/0252112 A1    9/2013   Doe et al.

FOREIGN PATENT DOCUMENTS

| | | |
|---|---|---|
| JP | 2014-504423 | 2/2014 |
| JP | 2016-103483 A | 6/2016 |

OTHER PUBLICATIONS

Hebié et al., Magnesium Anthracene System-Based Electrolyte as a Promoter of High Electrochemical Performance Rechargeable Magnesium Batteries, Published Feb. 14, 2018, ACS Appl. Mater. Interfaces 2018, 10, 6, 5527-5533 (Year: 2018).*

(Continued)

*Primary Examiner* — James M Erwin
(74) *Attorney, Agent, or Firm* — K&L Gates LLP

(57) ABSTRACT

Provided is an electrolytic solution for an electrochemical device having an electrode including magnesium as a negative electrode. The electrolytic solution includes a solvent having a linear ether and a magnesium salt included in the solvent, and a linear ether solvent further includes a cyclic organic compound having a two-dimensional structure or a three-dimensional structure.

16 Claims, 17 Drawing Sheets

(56) References Cited

OTHER PUBLICATIONS

Japanese Office Action issued Mar. 8, 2022 in corresponding Japanese Application No. 2020-554015.
International Search Report and Written Opinion mailed Jan. 21, 2020 in connection with PCT/JP2019/042703.
Chinese Office Action issued Jan. 26, 2024 in corresponding Chinese Application No. 201980072158.0.
Chinese Office Action issued May 31, 2024 in corresponding Chinese Application No. 201980072158.0.

* cited by examiner

ELECTROLYTIC SOLUTION AND ELECTROCHEMICAL DEVICE

CROSS REFERENCE TO RELATED APPLICATIONS

The present application is a continuation of PCT patent application no. PCT/JP2019/042703, filed on Oct. 24, 2019, which claims priority to Japanese patent application no. JP2018-204215 filed on Oct. 30, 2018, the entire contents of which are being incorporated herein by reference.

BACKGROUND

The present technology generally relates to an electrolytic solution and an electrochemical device.

Electrochemical devices include capacitors, air batteries, fuel cells, secondary batteries, and the like, and are used for various applications. The electrochemical device includes a positive electrode and a negative electrode, and has an electrolytic solution responsible for ion transport between the positive electrode and the negative electrode.

For example, as an electrode of an electrochemical device represented by a magnesium battery, an electrode composed of magnesium or an electrode containing at least magnesium is provided (hereinafter, such an electrode is referred to as "electrode containing magnesium" or simply referred to as "magnesium electrode", and an electrochemical device using the electrode containing magnesium is also referred to as a "magnesium electrode-based electrochemical device"). Magnesium is more resource-rich and much inexpensive than lithium. In addition, magnesium generally has a large amount of electricity per unit volume that can be extracted by a redox reaction, and is highly safe when used in an electrochemical device. Thus, magnesium batteries are drawing attention as a next-generation secondary battery to replace lithium ion batteries.

SUMMARY

The present technology generally relates to an electrolytic solution and an electrochemical device.

The inventor of the present disclosure noticed that there were still problems to be overcome in magnesium batteries, and found need to take measures therefor. Specifically, the inventor of the present invention found that there were the following problems.

Improvement of cycle characteristics is one of important issues in magnesium batteries in which magnesium is used for a negative electrode. Although it is conceivable to deal with this point depending on the type of Mg electrolytic solution, positive electrode material, etc., the current situation is that improvement for improving the cycle characteristics is still desired.

Although lithium-ion batteries which are widely used as secondary batteries can improve their cycle characteristics by an additive of an electrolytic solution, magnesium batteries are an extension of that, and dealing with similar additives is difficult. This is because an Mg coordination structure is very fragile in the electrolytic solution of the magnesium battery and activity of Mg precipitation/dissolution tends to be impaired by the additive for the lithium ion battery. That is, it is usually difficult to improve the cycle characteristics of the electrolytic solution of the magnesium battery.

The present technology has been made in view of the above problems. That is, a main object of the present invention is to provide an electrolytic solution capable of improving cycle characteristics in an electrochemical device including an electrode containing magnesium.

Rather than addressing as merely extensions of conventional arts, the present technology tried to solve the above problems by addressing from a new point of view. As a result, the invention of an electrolytic solution which has achieved the above-mentioned main purpose has been reached.

According to an embodiment of the present disclosure, an electrolytic solution for an electrochemical device having an electrode including magnesium as a negative electrode is provided. The electrolytic solution includes a solvent including a linear ether, and
    magnesium salt included in the solvent,
      in which the solvent further includes a cyclic organic compound having a two-dimensional structure or a three-dimensional structure.

The electrolytic solution of the present technology provides an electrochemical device with improved cycle characteristics. That is, although the electrochemical device using the electrolytic solution of the present invention is a so-called "magnesium electrode base", the cycle characteristics are further improved. The improved cycle characteristics make magnesium electrode-based electrochemical devices more suitable for use in a real environment.

The advantageous effects described in the description are merely illustrative and not restrictive, and the present technology may have additional effects.

DETAILED DESCRIPTION

Figure 1:
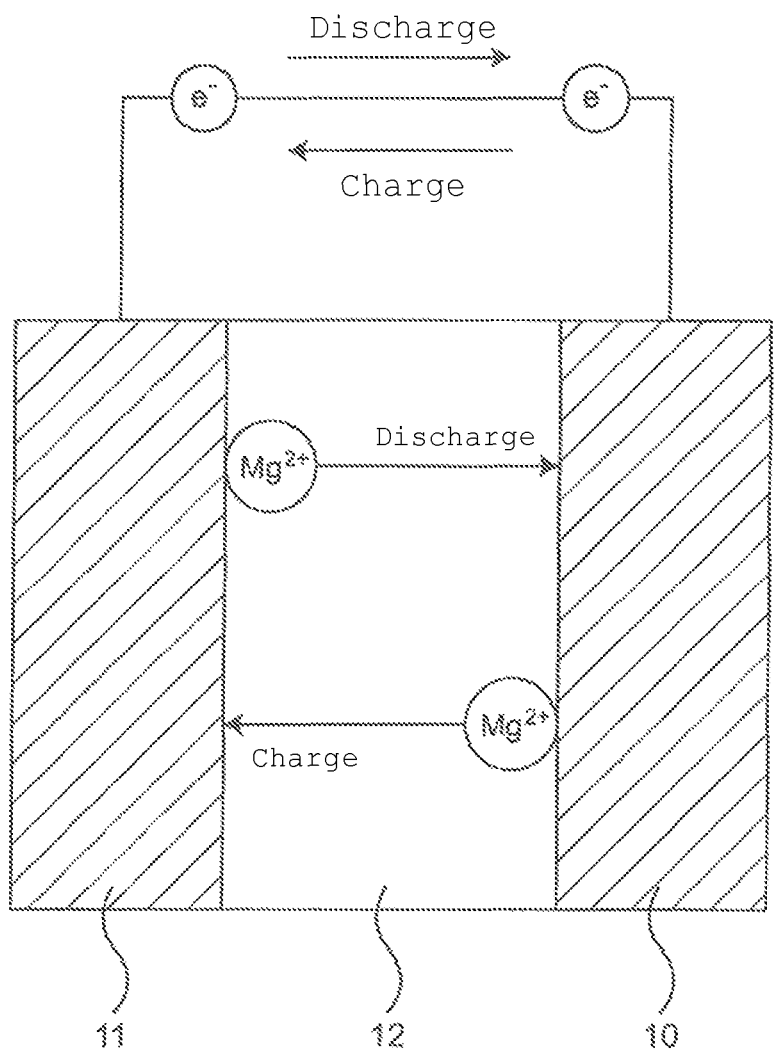
FIG. 1 is a conceptual diagram of a magnesium electrode-based electrochemical device (particularly a battery) according to an embodiment of the present technology.

Hereinafter, the "electrolytic solution for electrochemical device" and the "electrochemical device" of the present technology will be described in detail. Although description will be made with reference to the drawings as necessary, illustrated contents are schematically and exemplarily shown wherein their appearances, their dimensional proportions and the like are not necessarily real ones, and are merely for the purpose of making it easy to understand the present technology.

In the present technology, the "electrochemical device" broadly means a device capable of extracting energy by utilizing an electrochemical reaction. In a narrow sense, the "electrochemical device" in the present technology means a device including a pair of electrodes and an electrolyte, and in particular being charged and discharged with movement of ions. Although it is merely an example, examples of the electrochemical device include capacitors, air batteries, fuel cells, and the like, in addition to secondary batteries.

The electrolytic solution of the present technology is used for an electrochemical device. That is, the electrolytic solution described in the present specification corresponds to an electrolyte for a device capable of extracting energy by utilizing an electrochemical reaction.

As a major premise of the electrolytic solution of the present technology, the electrolytic solution is an electrolytic solution used for an electrochemical device including an electrode containing magnesium. In particular, the electrolytic solution is an electrolytic solution for an electrochemical device including an electrode containing magnesium as a negative electrode. Therefore, the electrolytic solution of the present technology can be said to be an electrolytic solution for a magnesium electrode-based electrochemical device (hereinafter, also simply referred to as a "magnesium electrode-based electrolytic solution").

As will be described in detail later, in such an electrochemical device, it is preferable that while the negative electrode is an electrode containing magnesium, the positive electrode is an electrode containing sulfur, that is, a sulfur electrode. That is, in a preferred embodiment, the electrolytic solution of the present technology is an electrolytic solution for magnesium (Mg)-sulfur (S) electrode.

The "electrode containing magnesium" used in the present specification broadly refers to an electrode having magnesium (Mg) as an active ingredient (that is, an active material). In a narrow sense, the "electrode containing magnesium" refers to an electrode composed of magnesium, for example, an electrode containing magnesium metal or magnesium alloy, particularly such a negative electrode. Although such an electrode containing magnesium may contain a component other than magnesium metal or magnesium alloy, in a preferred embodiment, this electrode is an electrode composed of a metal body of magnesium (for example, an electrode composed of a single substance of magnesium metal having a purity of 90% or more, preferably a purity of 95% or more, more preferably a purity of 98% or more).

The "sulfur electrode" used in the present specification broadly refers to an electrode having sulfur (S) as an active ingredient (that is, an active material). In a narrow sense, the "sulfur electrode" refers to an electrode containing at least sulfur, for example, an electrode containing sulfur (S) such as $S_8$ and/or polymeric sulfur, particularly such a positive electrode. The sulfur electrode may contain a component other than sulfur, and may contain, for example, a conductive aid and/or a binder. Although it is merely an example, the sulfur content in the sulfur electrode is preferably 5% by mass or more and 95% by mass or less, for example, approximately 70% by mass or more and 90% by mass or less based on the entire electrode.

The magnesium electrode-based electrolytic solution according to the present technology contains at least a solvent and a magnesium salt. More specifically, the electrolytic solution contains a magnesium salt and an ether solvent for dissolving the salt.

The solvent is an ether solvent, and is particularly preferably a linear ether. That is, it is preferable that ether having a linear structure in the molecule forms a magnesium electrode-based electrolytic solution solvent rather than cyclic ether such as tetrahydrofuran. In short, it can be said that the solvent in the magnesium electrode-based electrolytic solution according to the present technology is preferably a linear ether solvent.

The magnesium electrode-based electrolytic solution according to the present technology contains a cyclic organic compound having a two-dimensional structure or a three-dimensional structure. In particular, such a cyclic organic compound is added to an electrolytic solution solvent as an additive. That is, the "cyclic organic compound having a two-dimensional structure or a three-dimensional structure" is contained as a secondary component with respect to an ether solvent containing a magnesium salt, particularly a linear ether solvent.

In the present technology, the cycle characteristics of the battery can be improved due to the inclusion of the "cyclic organic compound having a two-dimensional structure or a three-dimensional structure" in the ether solvent of the electrolytic solution. In particular, when the "cyclic organic compound having a two-dimensional structure or a three-dimensional structure" is added to a linear ether containing a magnesium salt, the cycle characteristics can be significantly improved.

The electrolytic solution of the present technology is a so-called "magnesium electrode-based" electrolytic solution. It can be said that it is an extremely useful effect that the cycle characteristics are improved by adding the "cyclic organic compound having a two-dimensional structure or a three-dimensional structure" although the electrolytic solution is such a magnesium electrode-based electrolytic solution. This is because since it was assumed that the Mg coordination structure was very fragile, it was generally considered difficult to improve the cycle characteristics with additives. That is, in the present technology, although the electrochemical device is a "magnesium electrode-based" electrochemical device, the improvement of the cycle characteristics can bring about a way of using a battery more suitable for use in a real environment.

In the present specification, the "cyclic organic compound having a two-dimensional structure or a three-dimensional structure" broadly refers to a substance having a molecular structure in which rings are connected in a two-dimensional plane, or a substance having a molecular structure in which rings are three-dimensionally connected. In a narrow sense, the "cyclic organic compound having a two-dimensional structure" means an organic substance having a cyclic molecular structure so as to form a fused ring, and the "cyclic organic compound having a three-dimensional structure" means an organic substance having a network of cyclic molecules in a three-dimensional shape. A typical "cyclic organic compound having a three-dimensional structure" is fullerene.

That is, in the present technology, with respect to a linear ether containing a magnesium salt, an organic substance having a molecular structure in which ring structures are connected in a two-dimensional plane and/or an organic substance having a molecular structure in which ring structures are three-dimensionally connected are contained, whereby the cycle characteristics are improved.

In the present technology, the expression "the cycle characteristics are improved" means that in a magnesium electrode-based electrochemical device in which an electrolytic solution containing the "cyclic organic compound having a two-dimensional structure or a three-dimensional structure" and a "magnesium salt" is charged in a linear ether solvent, the cycle characteristics are improved over the cycle characteristics of the same magnesium electrode-based electrochemical device except that the "cyclic organic compound having a two-dimensional structure or a three-dimensional structure" is not contained. In particular, this expression means that a discharge capacity retention ratio when a charge/discharge cycle is repeated is relatively high (see FIGS. 11 to 16).

Here, the "cycle characteristics" in the present specification broadly means characteristics in which a decrease in discharge capacity is more sufficiently suppressed by repeated charging and discharging. In a narrow sense, the "cycle characteristics" refer to characteristics based on the discharge capacity retention ratio obtained by the following cycle test, and the expression "cycle characteristics are improved" means that the discharge capacity retention ratio is relatively high.

The cycle test is carried out in a constant temperature bath at 25° C. For discharge, constant current discharge is performed with a current value of 0.1 mA up to a discharge end voltage of 0.7 V. After resting for 1 hour after discharge, charge is started. For charge, constant current discharge is performed with a current value of 0.1 mA up to a charge end voltage of 2.2 V, and a 1 hour pause is made after charge. This charge/discharge cycle is repeated 20 times. In such a case, a ratio of a cell discharge capacity after the cycle to an initial discharge capacity is defined as a capacity retention ratio after the cycle.

In a preferred embodiment, the "cyclic organic compound having a two-dimensional structure or a three-dimensional structure" is a fused ring compound. That is, the cyclic organic compound is an organic substance having a molecular structure obtained as a result that two or more monocyclic rings supply their ring sides to each other. In the cyclic organic compound having a two-dimensional structure, a two-dimensional planar molecular structure may be formed so that two or more monocyclic rings share their ring sides with each other. In such a case, the two-dimensional planar molecular structure may be a linear fused ring type, a wing-like fused ring type, or the like. Similarly, in the cyclic organic compound having a three-dimensional structure, a three-dimensional molecular structure may be formed so that two or more monocyclic rings share their ring sides with each other.

The form of each ring in the fused ring compound may be a three-membered ring, a four-membered ring, a five-membered ring, a six-membered ring, a seven-membered ring or an eight-membered ring, and a combination thereof may be included as a whole of the fused ring compound. A monocyclic structure in the fused ring compound is not limited to an isocyclic ring, and may be a heterocyclic ring, or may be a combination thereof. The number of rings in the fused ring compound is not particularly limited.

The cycle characteristics of a magnesium electrode-based electrochemical device in which an electrolytic solution having a linear ether containing such a fused ring compound and a magnesium salt is charged can be improved. This is especially true if the device includes a sulfur electrode as the positive electrode. That is, the electrolytic solution of the present technology is an electrolytic solution for an electrochemical device including an electrode containing magnesium as the negative electrode, and the positive electrode of the electrochemical device is preferably a sulfur electrode. In the case of an electrochemical device including such a magnesium electrode-sulfur electrode pair (hereinafter, also referred to as "magnesium-sulfur electrode-based electrochemical device", "Mg—S battery", etc.), the electrolytic solution of the present technology can provide an effect of further improving the cycle characteristics of such a device. As the cycle characteristics become higher in this way, suitability for use of the magnesium-sulfur electrode-based electrochemical device in the real environment becomes higher, and the device becomes more easily achieved as desired. Assuming that the magnesium-sulfur electrode-based electrochemical device is a secondary battery, the present technology has found a possibility of the Mg—S battery more suitable for actual use.

In the present technology, the content of the "cyclic organic compound having a two-dimensional structure or a three-dimensional structure" such as the fused ring compound is preferably in a category of "additive" of the electrolytic solution. That is, an amount of a linear ether solvent containing a magnesium salt added to the electrolytic solution is preferably small. In this respect, the content of the cyclic organic compound in the electrolytic solution (based on the electrolytic solution as a whole) may be smaller than the content of the magnesium salt in the electrolytic solution (based on the electrolytic solution as a whole). In a preferred embodiment, the content of the cyclic organic compound in the electrolytic solution (amount of the cyclic organic compound relative to a total amount of the electrolytic solution) is ½ or less, ⅕ or less, ¹⁄₁₀ or less, or the like of the content of the magnesium salt in the electrolytic solution (amount of the magnesium salt relative to the total amount of the electrolytic solution).

In other words, a molar concentration of the cyclic organic compound based on the electrolytic solution may be lower than the content of the magnesium salt based on the electrolytic solution. Although it is merely an example, the content of the cyclic organic compound in the electrolytic solution may correspond to a very small amount of addition such as 0.5 M or less (based on the electrolytic solution as a whole), 0.1 M or less (based on the electrolytic solution as a whole), 0.05 M or less (based on the electrolytic solution as a whole), or 0.01 M or less (based on the electrolytic solution as a whole). With such a small content, the present technology can provide the effect of improving the cycle characteristics of the magnesium electrode-based electrochemical device.

The number of rings in the fused ring compound may be 40 or less, 30 or less or 20 or less, preferably 15 or less, and more preferably 10 or less. The lower limit of the number of such rings is not particularly limited, and is, for example, 2. In a preferred embodiment, the number of rings in the fused ring compound is 2 to 8 or 2 to 7, for example 2 to 6, 3 to 6 or 3 to 5. The form of the fused ring is not particularly limited, and may be a linear fused ring type and/or a wing-like fused ring type, which is particularly applicable to the cyclic organic compound having a two-dimensional structure.

Although it is merely an example, examples of the fused ring compounds in the present technology include at least one selected from the group consisting of pentalene (Chemical Formula 1), inden (Chemical Formula 2), naphthalene (Chemical Formula 3), azulene (Chemical Formula 4), heptalene (Chemical Formula 5), biphenylene (Chemical Formula 6), as-indacene (Chemical Formula 7), s-indacene (Chemical Formula 8), acenaphthylene (Chemical Formula 9), fluorene (Chemical Formula 10), phenalene (Chemical Formula 11), phenanthrene (Chemical Formula 12), anthracene (Chemical Formula 13), fluolanthene (Chemical Formula 14), acephenanthrylene (Chemical Formula 15), aceanthrylene (Chemical Formula 16), triphenylene (Chemical Formula 17), pyrene (Chemical Formula 18), chrysene (Chemical Formula 19), tetracene (Chemical Formula 20), pleiadene (Chemical Formula 21), picene (Chemical Formula 22), perylene (Chemical Formula 23), pentaphene (Chemical Formula 24), pentacene (Chemical Formula 25), tetraphenylene (Chemical Formula 26), hexaphene (Chemical Formula 27), and derivatives thereof.

[Chemical Formula 1]

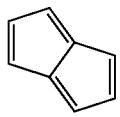

[Chemical Formula 2]

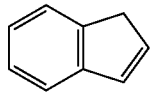

[Chemical Formula 3]

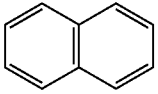

[Chemical Formula 4]

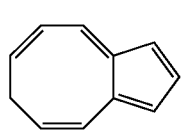

[Chemical Formula 5]

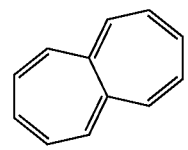

[Chemical Formula 6]

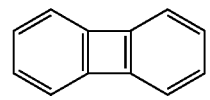

[Chemical Formula 7]

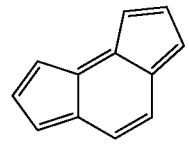

[Chemical Formula 8]

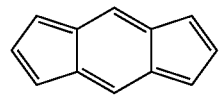

[Chemical Formula 9]

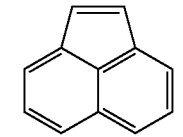

[Chemical Formula 10]

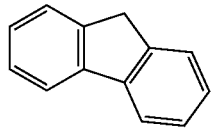

[Chemical Formula 11]

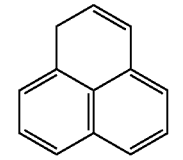

[Chemical Formula 12]

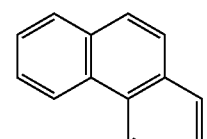

[Chemical Formula 13]

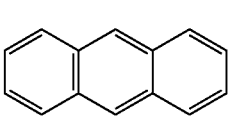

[Chemical Formula 14]

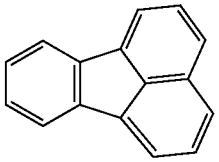

[Chemical Formula 15]

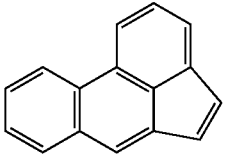

[Chemical Formula 16]

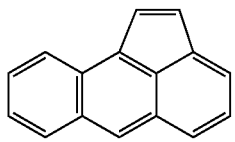

[Chemical Formula 17]

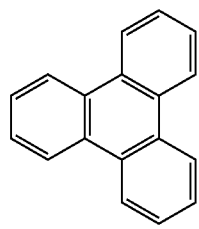

[Chemical Formula 18]

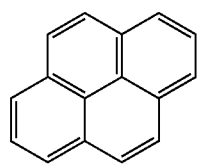

[Chemical Formula 19]

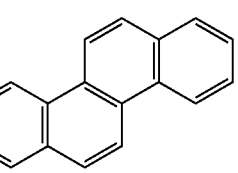

[Chemical Formula 20]

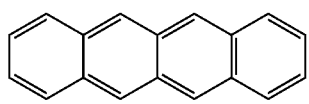

[Chemical Formula 21]

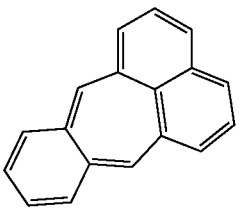

[Chemical Formula 22]

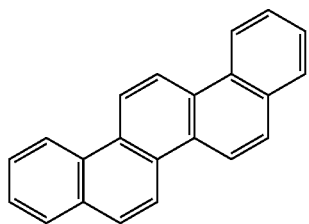

[Chemical Formula 23]

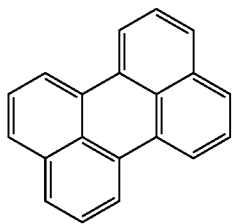

[Chemical Formula 24]

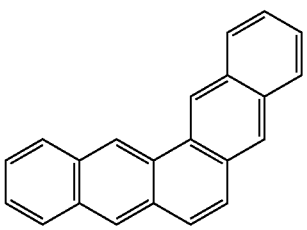

[Chemical Formula 25]

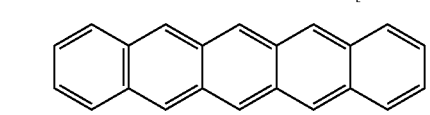

[Chemical Formula 26]

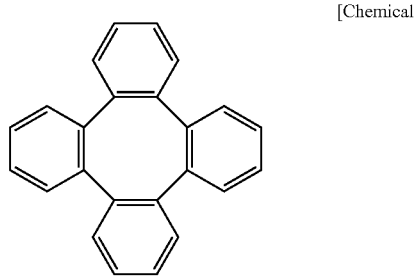

[Chemical Formula 27]

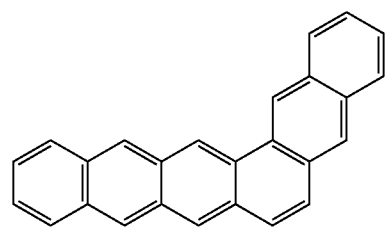

The aromatic fused ring compound may be a cyclic organic compound having a plurality of rings that can be formed by supplying at least one ring side thereof to each other by monocyclic rings of the aforementioned number, that is, a plurality of fused rings. Such aromatic fused rings may be connected to each other in the form of linear fused rings, or may be connected to each other in the form of wing-like fused rings.

On the other hand, the cyclic organic compound having a three-dimensional structure has a molecular structure in which individual monocyclic rings share two or more sides to form a three-dimensional structure. In a preferred embodiment, the cyclic organic compound has a three-dimensionally closed molecular structure in which all sides of monocyclic rings are shared by the rings. Such a cyclic organic compound is preferably fullerene or a derivative thereof. Fullerene C60 (Chemical Formula 28) is three-dimensionally composed of, for example, 12 five-membered rings and 20 six-membered rings connected to each other. That is, in the fullerene, the rings are connected to each other so as to form a three-dimensional shape as described above, and preferably, the fullerene has a spherical shape as a whole. That is, as illustrated by fullerene and the like, the cyclic organic compound has a non-planar molecular structure (preferably a spherical molecular structure) as a whole. The fullerene is not limited to C60, but may be C70, or may be a higher-order fullerene (C84, C90, C96, etc.) having a higher molecular weight.

[Chemical Formula 28]

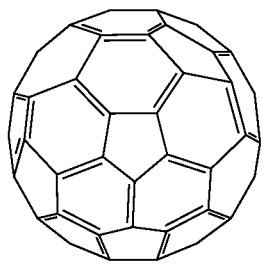

In a preferred embodiment, the fused ring compound is a benzene-based condensed compound. That is, the fused ring compound may have a ring structure in which two or more benzene rings are fused while using the benzene ring as a base. For example, there may be two benzene rings. For example, there are three benzene rings, and therefore, the fused ring compound may be phenanthrene, anthracene or a derivative thereof. Alternatively, there are five benzene rings, and therefore, the fused ring compound may be picene, pentaphene, pentacene or a derivative thereof.

As a more specific preferred example when there are three benzene rings, the fused ring compound contained in the electrolytic solution of the present technology may have an anthracene skeleton. That is, the fused ring compound may be a fused ring compound having, as a main skeleton, a ring structure in which three benzene rings are fused.

For example, as the fused ring compound contained in the electrolytic solution of the present technology, a fused ring compound having an anthracene skeleton as shown in [Chemical Formula 29] below may be used.

[Chemical Formula 29]

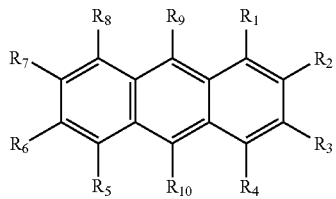

In the formula, $R_1$, $R_2$, $R_3$, $R_4$, $R_5$, $R_6$, $R_7$, $R_8$, $R_9$ and $R_{10}$ are each independently hydrogen atom, hydrocarbon group, halogen atom, oxygen-containing functional group, nitrogen-containing functional group or sulfur-containing functional group.

The hydrocarbon groups $R_1$ to $R_{10}$ in the anthracene skeleton may be each independently aliphatic hydrocarbon group, aromatic hydrocarbon group or aromatic aliphatic hydrocarbon group. The aliphatic hydrocarbon group, the aromatic hydrocarbon group and the aromatic-aliphatic hydrocarbon group do not necessarily have to have a linear structure, and may have a branched structure. The aliphatic hydrocarbon group may be a saturated hydrocarbon or an unsaturated hydrocarbon. The carbon number of each of such hydrocarbon groups may be about 1 to 50 (for example, 1 to 40, 1 to 30, 1 to 20 or 1 to 10).

The oxygen-containing functional group in the anthracene skeleton is a functional group containing at least an oxygen atom, and examples thereof include a hydroxy group, a carboxy group, an epoxy group and/or an aldehyde group. Furthermore, the oxygen-containing functional group may correspond to an ether bond site or an ester bond site. The nitrogen-containing functional group is a functional group containing at least a nitrogen atom, and examples thereof include an amino group, a nitro group and/or a nitroso group. The sulfur-containing group is a functional group containing at least a sulfur atom, and examples thereof include a thiol group, a sulfide group, a disulfide group, a sulfonyl group, a sulfo group, a thiocarbonyl group and/or a thiourea group. The oxygen-containing functional group, the nitrogen-containing functional group and the sulfur-containing group in the present specification may each have both concepts, and further may be in a category of a hydrocarbon group (aliphatic hydrocarbon group, aromatic hydrocarbon group or aromatic-aliphatic hydrocarbon group).

Each ring in the anthracene skeleton is not limited to an isocyclic ring and may be a heterocyclic ring. For the heterocyclic ring, the heteroatom may be, for example, a nitrogen atom, an oxygen atom and/or a sulfur atom.

Although it is merely an example of one preferred embodiment, when the fused ring compound is anthracene, the anthracene skeleton is composed of an isocyclic ring, and all $R_1$ to $R_{10}$ of the anthracene skeleton are hydrogen atoms. Thus, such a fused ring compound is preferably used as an electrolytic solution additive in a magnesium electrode-based electrochemical device, particularly a magnesium-sulfur electrode-based electrochemical device.

As an example of another preferred embodiment, the anthracene skeleton is composed of an isocyclic ring, $R_9$ or $R_{10}$ of the anthracene skeleton is a halogeno group (that is, halogen) or an aryl group, and the other Rs may be all hydrogen atoms. The halogen may be a fluorine atom (F), a chlorine atom (Cl), a bromine atom (Br) or an iodine atom (I). The aryl group is not particularly limited, and may be a phenyl group, a naphthyl group, an anthranil group, a phenanthryl group, a biphenyl group, or the like. That is, the fused ring compound may be a fused ring compound in which a functional group (functional group other than hydrogen) is introduced into the 9-position or 10-position of anthracene. Such a fused ring compound can be also preferably used as an electrolytic solution additive in a magnesium electrode-based electrochemical device, particularly a magnesium-sulfur electrode-based electrochemical device.

Although the fused ring compound having an anthracene skeleton is charged into an electrolytic solution containing a linear ether together with a magnesium salt, the amount of the fused ring compound may be a small amount, particularly a very small amount. Although it may depend on the type of the linear ether and/or magnesium salt of the electrolytic solution, the content of the "fused ring compound having an anthracene skeleton" in the electrolytic solution may be 0.1 M or less, further 0.05 M or less, and in some embodiments, the content may be 0.01 M or less. That is, the concentration of the "fused ring compound having an anthracene skeleton" is 0 (excluding 0) to 0.1 M based on the electrolytic solution as a whole, for example, 0 (excluding 0) to 0.05 M based on the electrolytic solution as a whole or 0 (excluding 0) to 0.01 M.

As described above, the additives contained in the electrolytic solution in the magnesium electrode-based electrochemical device have been described in detail. However, as can be seen from the additives exemplified above, it can be said that the "cyclic organic compound having a two-dimensional structure or a three-dimensional structure" in the present technology is preferably a π-electron compound. In other words, in the electrolytic solution of the present technology, a conjugated compound (particularly, a conjugated cyclic compound) having π electrons is preferably contained in the linear ether solvent together with the magnesium salt.

The "cyclic organic compound having a two-dimensional structure or a three-dimensional structure" can be identified by a visible/ultraviolet absorption spectrum method (UV), an infrared absorption spectrum method (IR), a nuclear magnetic resonance spectrum method (NMR), and/or mass spectrometry (MS (including GC-MS and/or LS-MS, etc.)).

In the magnesium electrode-based electrolytic solution, the solvent component is a linear ether. In the present technology, such a linear ether is preferably a linear ether having an ethyleneoxy structural unit represented by the following general formula.

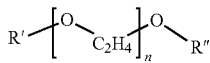

[Chemical Formula 30]

In the formula, R' and R" are each independently a hydrocarbon group having 1 or more and 10 or less carbon atoms, and n is an integer of 1 or more and 10 or less.

In the solvent used in the magnesium electrode-based electrolytic solution according to the present technology, the ethyleneoxy structural unit is 1 or more. The "ethyleneoxy structural unit" here refers to a molecular structural unit (—O—$C_2H_4$—) in which an ethylene group and an oxygen atom are bonded, and one or more such molecular structural units is included in a linear ether. For example, when one ethyleneoxy structural unit is included, linear ethers such as dimethoxyethane/DME (ethylene glycol dimethyl ether) and/or diethoxyethane/DEE (ethylene glycol diethyl ether) may be used.

In a preferred embodiment, the linear ether contains two or more molecular structural units (—O—$C_2H_4$—). From another point of view, it can be said that the linear ether in the magnesium electrode-based electrolytic solution preferably has a structure in which two or more molecules of glycol are dehydrated and condensed.

R' and R" in the above general formula of the linear ether each independently represent a hydrocarbon group. Thus, R' and R" may be each independently an aliphatic hydrocarbon group, an aromatic hydrocarbon group and/or an aromatic-aliphatic hydrocarbon group. Here, the "linear ether" in the present specification means that at least a site of the ethyleneoxy structural unit is not branched (that is, no branched structure is included). This means that R' and R" in the above general formula do not necessarily have to have a linear structure, but may have a branched structure. In a preferred embodiment, the linear ether used in the magnesium electrode-based electrolytic solution according to the present technology is a glycol ether in which not only a site of the ethyleneoxy structural unit but also R' and R" do not have a branched structure.

In the present technology, when the linear ether has the "ethyleneoxy structural unit" as described above, in combination with the additive of the "cyclic organic compound having a two-dimensional structure or a three-dimensional structure", the cycle characteristics in the magnesium electrode-based electrochemical device can be easily improved. That is, in the electrolytic solution, due to the coexistence of the solvent of the linear ether having at least "ethyleneoxy structural unit" and the additive of "cyclic organic compound having a two-dimensional structure or a three-dimensional structure", not a little favorable effect can be provided to the cycle characteristics.

When the linear ether has "two or more ethyleneoxy structural units", in combination with the existence of the additive of the "cyclic organic compound having a two-dimensional structure or a three-dimensional structure", the cycle characteristics in the magnesium electrode-based electrochemical device can be more easily improved. That is, in the electrolytic solution, due to the coexistence of the solvent of the linear ether having at least "two or more ethyleneoxy structural units" and the additive of "cyclic organic compound having a two-dimensional structure or a three-dimensional structure", a more significant effect can be provided to the cycle characteristics. It is conceivable that this is because the additive of the "cyclic organic compound having a two-dimensional structure or a three-dimensional structure" is combined with the linear ether solvent having the "two or more ethyleneoxy structural units" containing a magnesium salt to effectively affect the cycle characteristics of the magnesium electrode-based electrochemical device.

The linear ether having two or more ethyleneoxy structural units is not particularly limited, and examples thereof include diethylene glycol ether, triethylene glycol ether, tetraethylene glycol ether, pentaethylene glycol ether, and hexaethylene glycol ether. Similarly, the linear ether may be a heptaethylene glycol ether, an octaethylene glycol ether, a nonaethylene glycold ether, a decaethylene glycol ether, or the like, and more specifically, the linear ether may be a polyethylene glycol ether having more ethyleneoxy structural units.

In a preferred embodiment of the linear ether in the present technology, a hydrocarbon group having 1 or more and 10 or less carbon atoms is an aliphatic hydrocarbon group. That is, with respect to the linear ether contained in the magnesium electrode-based electrolytic solution according to the present technology, R' and R" in the above general formula may be each independently 1 or more and 10 or less aliphatic hydrocarbon groups. Although not particularly limited, examples thereof include ethylene glycol ether, diethylene glycol ether, triethylene glycol ether, tetraethylene glycol ether, pentaethylene glycol ether, and hexaethylene glycol ether as mentioned below. Similarly, the linear ether may be a heptaethylene glycol ether, an octaethylene glycol ether, a nonaethylene glycol ether, or a decaethylene glycol ether.

Ethylene glycol dimethyl ether, ethylene glycol ethyl methyl ether, ethylene glycol methyl propyl ether, ethylene glycol butyl methyl ether, ethylene glycol methyl pentyl ether, ethylene glycol methyl hexyl ether, ethylene glycol methyl heptyl ether, ethylene glycol methyl octyl ether;

ethylene glycol diethyl ether, ethylene glycol ethyl propyl ether, ethylene glycol butyl ethyl ether, ethylene glycol ethyl pentyl ether, ethylene glycol ethyl hexyl ether, ethylene glycol ethyl heptyl ether, ethylene glycol ethyl octyl ether;

ethylene glycol dipropyl ether, ethylene glycol butyl propyl ether, ethylene glycol propyl pentyl ether, ethylene glycol propyl hexyl ether, ethylene glycol propyl heptyl ether, ethylene glycol propyl octyl ether;

ethylene glycol dibutyl ether, ethylene glycol butyl pentyl ether, ethylene glycol butylhexyl ether, ethylene glycol butyl heptyl ether, ethylene glycol butyl octyl ether; ethylene glycol dipentyl ether, ethylene glycol hexylpentyl ether, ethylene glycol heptylpentyl ether, ethylene glycol octylpentyl ether;

ethylene glycol dihexyl ether, ethylene glycol heptylhexyl ether, ethylene glycol hexyloctyl ether;

ethylene glycol diheptyl ether, ethylene glycol heptyl octyl ether;

Ethylene glycol dioctyl ether diethylene glycol dimethyl ether, diethylene glycol ethyl methyl ether, diethylene glycol methyl propyl ether, diethylene glycol butyl methyl ether, diethylene glycol methyl pentyl ether, diethylene glycol methyl hexyl ether, diethylene glycol methyl heptyl ether, diethylene glycol methyl octyl ether;

diethylene glycol diethyl ether, diethylene glycol ethylpropyl ether, diethylene glycol butyl ethyl ether, diethylene glycol ethylpentyl ether, diethylene glycol ethylhexyl ether, diethylene glycol ethyl heptyl ether, diethylene glycol ethyl octyl ether;

diethylene glycol dipropyl ether, diethylene glycol butyl propyl ether, diethylene glycol propylpentyl ether, diethylene glycol propyl hexyl ether, diethylene glycol propyl heptyl ether, diethylene glycol propyl octyl ether;

diethylene glycol dibutyl ether, diethylene glycol butyl pentyl ether, diethylene glycol butylhexyl ether, diethylene glycol butyl heptyl ether, diethylene glycol butyl octyl ether;

diethylene glycol dipentyl ether, diethylene glycol hexylpentyl ether, diethylene glycol heptylpentyl ether, diethylene glycol octylpentyl ether;

diethylene glycol dihexyl ether, diethylene glycol heptylhexyl ether, diethylene glycol hexyloctyl ether;

diethylene glycol diheptyl ether, diethylene glycol heptyl octyl ether;

diethylene glycol dioctyl ether triethylene glycol dimethyl ether, triethylene glycol ethyl methyl ether, triethylene glycol methyl propyl ether, triethylene glycol butyl methyl ether, triethylene glycol methyl pentyl ether, triethylene glycol methyl hexyl ether, triethylene glycol methyl heptyl ether, triethylene glycolmethyloctyl ether;

triethylene glycol diethyl ether, triethylene glycol ethylpropyl ether, triethylene glycol butyl ethyl ether, triethylene glycol ethylpentyl ether, triethylene glycol ethylhexyl ether, triethylene glycol ethyl heptyl ether, triethylene glycol ethyl octyl ether;

triethylene glycol dipropyl ether, triethylene glycol butylpropyl ether, triethylene glycol propylpentyl ether, triethylene glycol propylhexyl ether, triethylene glycol propyl heptyl ether, triethylene glycol propyl octyl ether;

triethylene glycol dibutyl ether, triethylene glycol butyl pentyl ether, triethylene glycol butylhexyl ether, triethylene glycol butyl heptyl ether, triethylene glycol butyl octyl ether;

triethylene glycol dipentyl ether, triethylene glycol hexylpentyl ether, triethylene glycol heptylpentyl ether, triethylene glycol octylpentyl ether;

triethylene glycol dihexyl ether, triethylene glycol heptylhexyl ether, triethylene glycol hexyloctyl ether;

triethylene glycol diheptyl ether, triethylene glycol heptyl octyl ether;

triethylene glycol dioctyl ether

Tetraethylene glycol dimethyl ether, tetraethylene glycol ethyl methyl ether, tetraethylene glycol methyl propyl ether, tetraethylene glycol butyl methyl ether, tetraethylene glycol methyl pentyl ether, tetraethylene glycol methyl hexyl ether, tetraethylene glycol methyl heptyl ether, tetraethylene glycolmethyloctyl ether;

tetraethylene glycol diethyl ether, tetraethylene glycol ethylpropyl ether, tetraethylene glycol butyl ethyl ether, tetraethylene glycol ethylpentyl ether, tetraethylene glycol ethylhexyl ether, tetraethylene glycol ethyl heptyl ether, tetraethylene glycol ethyl octyl ether;

tetraethylene glycol dipropyl ether, tetraethylene glycol butylpropyl ether, tetraethylene glycol propylpentyl ether, tetraethylene glycol propylhexyl ether, tetraethylene glycol propyl heptyl ether, tetraethylene glycol propyl octyl ether;

tetraethylene glycol dibutyl ether, tetraethylene glycol butyl pentyl ether, tetraethylene glycol butylhexyl ether, tetraethylene glycol butyl heptyl ether, tetraethylene glycol butyl octyl ether;

tetraethylene glycol dipentyl ether, tetraethylene glycol hexylpentyl ether, tetraethylene glycol heptylpentyl ether, tetraethylene glycol octylpentyl ether;

tetraethylene glycol dihexyl ether, tetraethylene glycol heptylhexyl ether, tetraethylene glycol hexyloctyl ether;

tetraethylene glycol diheptyl ether, tetraethylene glycol heptyloctyl ether;

tetraethylene glycol dioctyl ether pentaethylene glycol dimethyl ether, pentaethylene glycol ethyl methyl ether, pentaethylene glycol methyl propyl ether, pentaethylene glycol butyl methyl ether, pentaethylene glycol methyl pentyl ether, pentaethylene glycol methyl hexyl ether, pentaethylene glycol methyl heptyl ether, pentaethylene glycolmethyloctyl ether;

pentaethylene glycol diethyl ether, pentaethylene glycol ethylpropyl ether, pentaethylene glycol butyl ethyl ether, pentaethylene glycol ethylpentyl ether, pentaethylene glycol ethylhexyl ether, pentaethylene glycol ethyl heptyl ether, pentaethylene glycol ethyl octyl ether;

pentaethylene glycol dipropyl ether, pentaethylene glycol butylpropyl ether, pentaethylene glycol propylpentyl ether, pentaethylene glycol propylhexyl ether, pentaethylene glycol propyl heptyl ether, pentaethylene glycol propyl octyl ether;

pentaethylene glycol dibutyl ether, pentaethylene glycol butyl pentyl ether, pentaethylene glycol butylhexyl ether, pentaethylene glycol butyl heptyl ether, pentaethylene glycol butyl octyl ether;

pentaethylene glycol dipentyl ether, pentaethylene glycol hexylpentyl ether, pentaethylene glycol heptylpentyl ether, pentaethylene glycol octylpentyl ether;

pentaethylene glycol dihexyl ether, pentaethylene glycol heptylhexyl ether, pentaethylene glycol hexyl octyl ether;

pentaethylene glycol diheptyl ether, pentaethylene glycol heptyl octyl ether;

pentaethylene glycol dioctyl ether hexaethylene glycol dimethyl ether, hexaethylene glycol ethyl methyl ether, hexaethylene glycol methyl propyl ether, hexaethylene glycol butyl methyl ether, hexaethylene glycol methyl pentyl ether, hexaethylene glycol methyl hexyl ether, hexaethylene glycol methyl heptyl ether, hexaethylene glycolmethyloctyl ether;

hexaethylene glycol diethyl ether, hexaethylene glycol ethylpropyl ether, hexaethylene glycol butyl ethyl ether, hexaethylene glycol ethylpentyl ether, hexaethylene glycol ethylhexyl ether, hexaethylene glycol ethyl heptyl ether, hexaethylene glycol ethyl octyl ether;

hexaethylene glycol dipropyl ether, hexaethylene glycol butylpropyl ether, hexaethylene glycol propylpentyl ether, hexaethylene glycol propylhexyl ether, hexaethylene glycol propyl heptyl ether, hexaethylene glycol propyl octyl ether;

hexaethylene glycol dibutyl ether, hexaethylene glycol butyl pentyl ether, hexaethylene glycol butylhexyl ether, hexaethylene glycol butyl heptyl ether, hexaethylene glycol butyl octyl ether;

hexaethylene glycol dipentyl ether, hexaethylene glycol hexylpentyl ether, hexaethylene glycol heptylpentyl ether, hexaethylene glycol octylpentyl ether;

hexaethylene glycol dihexyl ether, hexaethylene glycol heptylhexyl ether, hexaethylene glycol hexyl octyl ether;

hexaethylene glycol diheptyl ether, hexaethylene glycol heptyl octyl ether;

hexaethylene glycol dioctyl ether

Similarly, the linear ether may be a heptaethylene glycol ether, an octaethylene glycol ether, a nonaethylene glycol ether, a decaethylene glycol ether, or the like, and more specifically, the linear ether may be a polyethylene glycol ether.

In the magnesium electrode-based electrolytic solution according to the present technology, the "cyclic organic compound having a two-dimensional structure or a three-dimensional structure" as described above and the linear ether coexist with the magnesium salt. Preferably, the magnesium salt is in a state of being dissolved in the linear ether. The magnesium salt combined with the linear ether may be one kind or may be a magnesium salt consisting of more kinds.

In a preferred embodiment, in the magnesium electrode-based electrolytic solution according to the present technology, the linear ether as a solvent has an ethyleneoxy structural unit (preferably two or more ethyleneoxy structural units), and one or more magnesium salts that dissolve in a solvent having such a structural unit and the "cyclic organic compound having a two-dimensional structure or a three-dimensional structure" exist, whereby the magnesium electrode-based electrochemical device can easily exhibit higher cycle characteristics.

Examples of such a magnesium salt include a salt having the general formula $MgX_n$ (where n is 1 or 2 and X is a monovalent or divalent anion). If X is a halogen (F, Cl, Br, I), such a magnesium salt forms a halogen metal salt. X may be another anion and, for example, at least one magnesium salt selected from the group consisting of magnesium perchlorate ($Mg(ClO_4)_2$), magnesium nitrate ($Mg(NO_3)_2$), magnesium sulfate ($MgSO_4$), magnesium acetate ($Mg(CH_3COO)_2$), magnesium trifluoroacetate ($Mg(CF_3COO)_2$), magnesium tetrafluoroborate ($Mg(BF_4)_2$), magnesium tetraphenylborate ($Mg(B(C_6H_5)_4)_2$), magnesium hexafluorophosphate ($Mg(PF_6)_2$), magnesium hexafluoroarsenate ($Mg(AsF_6)_2$), magnesium salt of perfluoroalkylsulfonic acid (($Mg(R_{f1}SO_3)_2$), wherein $R_{f1}$ is a perfluoroalkyl group), magnesium salt of perfluoroalkylsulfonylimide ($Mg((Re_{f1}SO_2)_2N)_2$, wherein $R_{f2}$ is a perfluoroalkyl group), and magnesium salt of hexaalkyldisilazide (($Mg(HRDS)_2$), wherein R is an alkyl group).

Among the above, at least one of halogen-based salts and imide-based salts is particularly preferable as the magnesium salt. That is, the magnesium salt coexisting with the "cyclic organic compound having a two-dimensional structure or a three-dimensional structure" in the linear ether may be a halogen metal salt or an imide metal salt, or may be a combination of the halogen metal salt and the imide metal salt. This means that at least one of the halogen metal salt and the imide metal salt as the magnesium salt is in a state of being dissolved in the linear ether together with the "cyclic organic compound having a two-dimensional structure or a three-dimensional structure". By using such a magnesium salt, the magnesium electrode-based electrochemical device can more easily exhibit higher cycle characteristics. In a preferred embodiment, in the linear ether, an imide metal salt may be further added in addition to a halogen metal salt, whereby high cycle characteristics can be promoted more effectively.

Examples of the halogen metal salt include at least one selected from the group consisting of magnesium fluoride ($MgF_2$), magnesium chloride ($MgCl_2$), magnesium bromide ($MgBr_2$) and magnesium iodide ($MgI_2$). Among them, magnesium chloride is preferably used as a halogen metal salt. That is, magnesium chloride ($MgCl_2$) is preferable as the magnesium salt combined with the linear ether and the "cyclic organic compound having a two-dimensional structure or a three-dimensional structure". This is because in such magnesium chloride ($MgCl_2$), high cycle characteristics become easily achieved in an electrochemical device.

The imide metal salt is a magnesium salt having an imide as a molecular structure. Preferably, the imide metal salt is a magnesium salt having a sulfonylimide as a molecular structure. This is because in a magnesium salt having a sulfonylimide as a molecular structure, high cycle characteristics become easily achieved in an electrochemical device. In a preferred embodiment, in combination with the halogen metal salt (for example, magnesium chloride) and the "cyclic organic compound having a two-dimensional structure or a three-dimensional structure", the magnesium salt having a sulfonylimide as a molecular structure can contribute to the achievement of high cycle characteristics in the magnesium electrode-based electrochemical device.

The imide metal salt is preferably a magnesium salt of perfluoroalkylsulfonylimide. That is, the imide metal salt is preferably $Mg((R_fSO_2)_2N)_2$ (in the formula, $R_f$: perfluoroalkyl group). For example, $R_f$ may be a perfluoroalkyl group having 1 or more and 10 or less carbon atoms, a perfluoroalkyl group having 1 or more and 8 or less carbon atoms, a perfluoroalkyl group having 1 or more and 6 or less carbon atoms, a perfluoroalkyl group having 1 or more and 4 or less carbon atoms, a perfluoroalkyl group having 1 or more and 3 or less carbon atoms, or a perfluoroalkyl group having 1 or more and 2 or less carbon atoms. As an example, the imide metal salt may be magnesium bis (trifluoromethanesulfonyl) imide, that is, $Mg(TFSI)_2$. Such $Mg(TFSI)_2$ easily achieves high cycle characteristics in the electrochemical device. In a preferred embodiment, in combination with the halogen metal salt (particularly magnesium chloride ($MgCl_2$)) and the "cyclic organic compound having a two-dimensional structure or a three-dimensional structure", Mg(TFSI) 2 can promote high cycle characteristics of the magnesium electrode-based electrochemical device.

In another embodiment, the linear ether solvent may contain a further magnesium salt having a disilazide structure represented by the general formula $(R_3Si)_2N$ (in the formula, R is a hydrocarbon group having 1 or more and 10 or less carbon atoms). For example, in addition to the halogen metal salt or in addition to the combination of the halogen metal salt and the imide metal salt, the disilazide structure represented by the general formula $(R_3Si)_2N$ (in the formula, R is a hydrocarbon group having 1 or more and 10 or less carbon atoms) may be included. The R in the silazide structure of the further magnesium salt is preferably an aliphatic hydrocarbon group having 1 or more and 10 or less carbon atoms, and more preferably a lower alkyl group having 1 or more and 4 or less carbon atoms. As just an example, magnesium bis (hexamethyldisilazide) can be mentioned. In combination with the "cyclic organic compound having a two-dimensional structure or a three-dimensional structure" and the halogen metal salt (particularly magnesium chloride ($MgCl_2$)) and/or the imide metal salt (particularly, $Mg(TFSI)_2$), the "further magnesium sale" having such a disilazide structure can promote high cycle characteristics of the magnesium electrode-based electrochemical device.

In the magnesium electrode-based electrolytic solution according to the present technology, the solvent of the linear ether combined with the additive and the magnesium salt has an ethyleneoxy structural unit. The solvent of the linear ether preferably has 2 to 4 ethyleneoxy structural units. That is, in the above general formula representing a linear ether, n may be an integer of 2 or more and 4 or less, and the linear ether may be an ether having 2 or more and 4 or less ethyleneoxy structural units. In a preferred embodiment, the solvent of the linear ether combined with the magnesium salt and the "cyclic organic compound having a two-dimensional structure or a three-dimensional structure" is at least one selected from the group consisting of diethylene glycol ether, triethylene glycol ether and tetraethylene glycol ether.

In the magnesium electrode-based electrolytic solution according to the present technology, the solvent of the linear ether combined with the "cyclic organic compound having a two-dimensional structure or a three-dimensional structure" and the magnesium salt may particularly have a lower alkyl group having 1 to 4 carbon atoms. In other words, in the above general formula representing a linear ether, R' and R" may be each independently an alkyl group having 1 or more and 4 or less carbon atoms.

Regarding this, in a preferred embodiment, in a glycol ether such as an ethylene glycol ether, a diethylene glycol ether, a triethylene glycol ether, a tetraethylene glycol ether, a pentaethylene glycol ether, a hexaethylene glycol ether, a heptaethylene glycol ether, an octaethylene glycol ether, a nonaethylene glycol ether, or a decaethylene glycol ether, the linear ether contained in the magnesium electrode-based electrolytic solution according to the present technology may be dimethyl ether, ethyl methyl ether, methyl propyl ether, butyl methyl ether, diethyl ether, ethyl propyl ether, butyl ethyl ether, dipropyl ether, butyl propyl ether, and/or dibutyl ether.

For example, in the magnesium electrode-based electrolytic solution according to the present technology, the solvent of the linear ether combined with the additive and the magnesium salt particularly may have two ethyleneoxy structural units. That is, in the above general formula representing a linear ether, n may be an integer of 2, and therefore, the linear ether may be an ether having two ethyleneoxy structural units. In a preferred embodiment, the solvent of the linear ether combined with the "cyclic organic compound having a two-dimensional structure or a three-dimensional structure" and the magnesium salt is a diethylene glycol ether.

In addition, in the magnesium electrode-based electrolytic solution according to the present technology, the solvent of the linear ether combined with the additive and the magnesium salt particularly may have the same alkyl group as each other. That is, in the above general formula representing a linear ether, R' and R" may be the same alkyl group as each other.

Regarding this, in a preferred embodiment, in a glycol ether such as an ethylene glycol ether, a diethylene glycol ether, a triethylene glycol ether, a tetraethylene glycol ether, a pentaethylene glycol ether, a hexaethylene glycol ether, a heptaethylene glycol ether, an octaethylene glycol ether, a nonaethylene glycol ether, or a decaethylene glycol ether, the linear ether contained in the magnesium electrode-based electrolytic solution according to the present technology may be dimethyl ether, diethyl ether, dipropyl ether, dibutyl ether, dipentyl ether, dihexyl ether, diheptyl ether, and/or dioctyl ether.

In the magnesium electrode-based electrolytic solution according to the present technology, the linear ether as a solvent may be at least one selected from the group consisting of ethylene glycol dimethyl ether, diethylene glycol dimethyl ether, diethylene glycol diethyl ether and diethylene glycol ethyl methyl ether. Regarding this, in a preferred embodiment of the present technology, the linear ether as the solvent of the magnesium electrode-based electrolytic solution is ethylene glycol dimethyl ether, diethylene glycol dimethyl ether and/or diethylene glycol ethyl methyl ether, and the magnesium salt contained in such a solvent is a combination of a halogen metal salt and an imide metal salt. For example, in the magnesium electrode-based electrolytic solution according to the present technology, the linear ether as the solvent is ethylene glycol dimethyl ether, diethylene glycol dimethyl ether and/or diethylene glycol ethyl methyl ether, the halogen metal salt contained in such a solvent is magnesium chloride, the imide salt may be a magnesium salt of perfluoroalkylsulfonylimide (for example, $Mg(TFSI)_2$), and the "cyclic organic compound having a two-dimensional structure or a three-dimensional structure" may be a fused ring compound in which the number of rings is 3 to 6 (for example, a fused ring compound having an anthracene skeleton typified by anthracene).

Next, the electrochemical device of the present technology will be described. Such an electrochemical device includes a negative electrode and a positive electrode, and a magnesium electrode is provided as the negative electrode. Such an electrochemical device is characterized in that the electrolytic solution involves the above-mentioned electrolytic solution.

That is, the electrolytic solution of the electrochemical device of the present technology contains at least a solvent, a magnesium salt and an additive, and while the solvent is an ether solvent, the additive is a "cyclic organic compound having a two-dimensional structure or a three-dimensional structure". That is, in the electrochemical device, a substance having a molecular structure in which ring structures are connected in a two-dimensional plane and/or a substance having a molecular structure in which ring structures are three-dimensionally connected are/is contained in the electrolytic solution solvent.

The electrochemical device of the present technology is an electrode whose negative electrode contains magnesium, and corresponds to the magnesium electrode-based electrochemical device. The "cyclic organic compound having a two-dimensional structure or a three-dimensional structure" used as an additive in the electrolytic solution of such a magnesium electrode-based electrochemical device may be a fused ring compound. That is, the cyclic organic compound contained in the electrolytic solution of the magnesium electrode-based electrochemical device may be an organic substance having a molecular structure that can be formed such that two or more monocyclic rings supply their ring sides to each other. In the cyclic organic compound having a two-dimensional structure, two or more monocyclic rings may supply their ring sides to each other to form a two-dimensional planar molecular structure, and in the cyclic organic compound having a three-dimensional structure, two or more monocyclic rings may supply their ring sides to each other to form a three-dimensional molecular structure.

The number of rings in the fused ring compound may be 20 or less, preferably 15 or less, and more preferably 10 or less. For example, the number of rings in the fused ring compound (particularly the number of rings at a fused ring site) is 2 to 8 or 2 to 7, and may be, for example, 2 to 6, 3 to 6 or 3 to 5. The form of the fused ring is not particularly limited, and may be a linear fused ring type and/or a wing-like fused ring type. The aromatic fused ring compound may be a cyclic organic compound having a fused ring that can be formed by supplying one or more ring sides thereof to each other by monocyclic rings of the aforementioned number. Such aromatic fused rings may be connected to each other in the form of linear fused rings, or may be connected to each other in the form of wing-like fused rings.

For example, there are three aromatic rings, and therefore, the fused ring compound may be phenanthrene, anthracene or a derivative thereof. Alternatively, there are five aromatic rings, and therefore, the fused ring compound may be picene, pentaphene, pentacene or a derivative thereof.

Although it is merely an example, as the fused ring compound contained in the electrolytic solution of the present technology, a fused ring compound having an anthracene skeleton as shown in the formula below may be used.

[Chemical Formula 29]

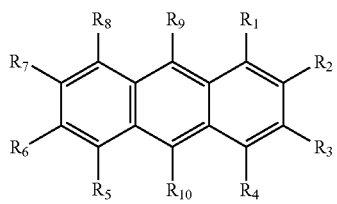

In the formula, $R_1$, $R_2$, $R_3$, $R_4$, $R_5$, $R_6$, $R_7$, $R_8$, $R_9$ and $R_{10}$ are each independently hydrogen atom, hydrocarbon group, halogen atom, oxygen-containing functional group, nitrogen-containing functional group or sulfur-containing functional group.

The hydrocarbon groups $R_1$ to $R_{10}$ in the anthracene skeleton may be each independently aliphatic hydrocarbon group, aromatic hydrocarbon group or aromatic aliphatic hydrocarbon group. The aliphatic hydrocarbon group, the aromatic hydrocarbon group and the aromatic-aliphatic hydrocarbon group do not necessarily have to have a linear structure, and may have a branched structure. The hydrocarbon group (particularly, aliphatic hydrocarbon group) may be a saturated hydrocarbon or a saturated hydrocarbon. The carbon number of each of such hydrocarbon groups may be about 1 to 50 (for example, 1 to 40, 1 to 30, 1 to 20 or 1 to 10). The oxygen-containing functional group in the anthracene skeleton is a functional group containing at least an oxygen atom, and examples thereof include a hydroxy group, a carboxy group, an epoxy group, and/or an aldehyde group. Furthermore, the oxygen-containing functional group may correspond to an ether bond site or an ester bond site. The nitrogen-containing functional group is a functional group containing at least a nitrogen atom, and examples thereof include an amino group, a nitro group and/or a nitroso group. The sulfur-containing group is a functional group containing at least a sulfur atom, and examples thereof include a thiol group, a sulfide group, a disulfide group, a sulfonyl group, a sulfo group, a thiocarbonyl group and/or a thiourea group. Each ring in the anthracene skeleton is not limited to an isocyclic ring and may be a heterocyclic ring. The heteroatom in the heterocyclic ring may be, for example, a nitrogen atom, an oxygen atom and/or a sulfur atom.

Although it is merely an example of one preferred embodiment, the fused ring compound may be provided as anthracene in which the anthracene skeleton of the fused ring compound is composed of an isocyclic ring and all $R_1$ to $R_{10}$ are hydrogen atoms. Furthermore, the fused ring compound may be provided as a fused ring compound in which $R_9$ or $R_{10}$ of the anthracene skeleton is a halogen or an aryl group and all the other Rs are hydrogen atoms. In the magnesium electrode-based electrochemical device of the present technology (particularly magnesium-sulfur electrode-based electrochemical device), such a fused ring compound is preferably used as an electrolytic solution additive.

Although an electrolytic solution containing a linear ether containing a magnesium salt is charged into the fused ring compound having an anthracene skeleton, the amount of the electrolytic solution may be a small amount, particularly a very small amount. Although it may depend on the type of the linear ether and/or magnesium salt of the electrolytic solution, the content of the "fused ring compound having an anthracene skeleton" in the electrolytic solution may be 0.1 M or less, further 0.05 M or less, and the concentration may be, for example, 0.01 M or less, that is, a concentration of about 0 (excluding 0) to 0.01 M based on the electrolytic solution.

The ether used as a solvent in the electrolytic solution of the magnesium electrode-based electrochemical device is preferably a linear ether. That is, instead of a cyclic ether such as tetrahydrofuran, an ether having a linear molecular structure is contained as an electrolytic solution solvent.

Such a linear ether solvent is preferably an ether having one or more ethyleneoxy structural units represented by the following general formula.

[Chemical Formula 30]

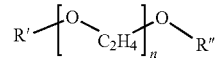

In the formula, R' and R" are each independently a hydrocarbon group having 1 or more and 10 or less carbon atoms, and n is an integer of 1 or more and 10 or less.

In such a magnesium electrode-based electrochemical device, the linear ether of the electrolytic solution of the device has an ethyleneoxy structural unit, and therefore, it is possible to contribute to the improvement of the cycle characteristics. That is, the inclusion of the ethyleneoxy structural unit (preferably two or more ethyleneoxy structural units) in an electrolyte solvent used in the magnesium electrode-based electrochemical device according to the present technology can be indirectly related to the improvement of the cycle characteristics.

In the linear ether having an "ethyleneoxy structural unit", R' and R" in the above general formula may be each independently 1 or more and 10 or less aliphatic hydrocarbon groups. In such a linear ether having an "ethyleneoxy structural unit", for example, in the above general formula, n may be an integer of 2 or more and 4 or less, and therefore, the linear ether may be an ether having 2 or more and 4 or less ethyleneoxy structural units. In the solvent of the linear ether having an "ethyleneoxy structural unit" (preferably "two or more ethyleneoxy structural units"), in the above general formula, R' and R" may be each independently a lower alkyl group having 1 or more and 4 or less carbon atoms. In addition, in the solvent of the linear ether having an "ethyleneoxy structural unit" (preferably "two or more ethyleneoxy structural units"), R' and R" in the above general formula may be the same alkyl group as each other.

As just an example, in the magnesium electrode-based electrochemical device of the present technology, the linear ether solvent having an "ethylene oxy structural unit" may be at least one selected from the group consisting of ethylene glycol dimethyl ether, diethylene glycol dimethyl ether, diethylene glycol diethyl ether and diethylene glycol ethyl methyl ether, and may be, for example, ethylene glycol dimethyl ether and/or diethylene glycol dimethyl ether.

In the magnesium electrode-based electrochemical device, the ether in the electrolytic solution coexists with the magnesium salt together with the additive, and such coexistence can further promote the improvement of the cycle characteristics in the magnesium electrode-based electrochemical device of the present technology.

The magnesium salt preferably contains at least a halogen metal salt. This means that the magnesium salt dissolved in the linear ether solvent having an "ethyleneoxy structural unit" (preferably "two or more ethyleneoxy structural units") may be one kind or may be a magnesium salt consisting of more kinds. In one embodiment, the magnesium salt is two kinds of salts, and is a combination of a halogen metal salt and an imide metal salt. The halogen metal salt is, for example, magnesium chloride ($MgCl_2$), and the imide salt may be a magnesium salt of perfluoroalkylsulfonylimide, for example, $Mg(TFSI)_2$. $MgCl_2$ and $Mg(TFSI)_2$ are Mg salts with relatively high stability. Thus, if $MgCl_2$ and $Mg(TFSI)_2$ are contained in a high concentration in a linear ether solvent, high safety can be obtained. This can be an advantage over conventional electrolytic solutions using $AlCl_3$ and Grignard. Moreover, since $MgCl_2$ and $Mg(TFSI)_2$ have low reactivity, side reactions other than the electrochemical reaction with sulfur do not occur, and higher capacity can be expected. In addition, since an overvoltage of precipitation and dissolution of magnesium is low, a charge/discharge hysteresis can be narrower than that in conventional reports, and in that respect as well, a higher energy density of the device can be expected. In addition, a total Mg salt concentration can be made very high, high ionic conductivity and high rate characteristics can be expected, and since the freezing point is lower and the boiling point is higher, an electrochemical device with a wide temperature range can be provided.

When two kinds of salts such as a combination of a halogen metal salt and an imide metal salt are used as the magnesium salt, substance amounts of these salts may be about the same (in a specific example, they may be equimolar amounts). Although not particularly limited, taking a combination of $MgCl_2$ and $Mg(TFSI)_2$ as an example, a molar ratio of $MgCl_2$: $Mg(TFSI)_2$ may be about 1:0.3 to 1.7, for example, about 1:0.4 to 1.6 or about 1:0.5 to 1.5, or may be about 1:0.7 to 1.3, for example, about 1:0.85 to 1.25 depending on the type of linear ether.

In the electrochemical device of the present technology, the positive electrode is preferably a sulfur electrode containing at least sulfur. That is, the sulfur electrode of the electrochemical device of the present technology is preferably configured as a positive electrode of sulfur (S) such as S& and/or polymeric sulfur. Since the negative electrode is an electrode containing magnesium, the electrochemical device of the present technology is an electrochemical device including a magnesium electrode-sulfur electrode pair, and by including a suitable electrolytic solution therein, improved high cycle characteristics are exhibited. Since higher cycle characteristics means that suitability for use of the magnesium-sulfur electrode-based electrochemical device in the real environment becomes higher, a desired device can be easily achieved. That is, the present technology can provide Mg—S batteries that are more suitable for actual use.

The sulfur electrode is an electrode containing at least sulfur, and may also contain a conductive aid and/or a binder, etc. In such a case, the sulfur content in the sulfur electrode may be 5% by mass or more and 95% by mass or less, preferably 70% by mass or more and 90% by mass or less based on the entire electrode.

Examples of the conductive aid contained in the sulfur electrode use as the positive electrode include carbon materials such as graphite, carbon fibers, carbon black and carbon nanotubes, and these components may be used singly, or two or more of them may be used in the form of a mixture. As the carton fibers, for example, vapor growth carbon fibers (VGCFs (registered trademark)) and the like can be used. As the carbon black, for example, acetylene black and/or Ketjen black can be used. As the carbon nanotubes, for example, single-wall carbon nanotubes (SWCNTs) and/or multi-wall carbon nanotubes (MWCNTs) such as double-wall carbon nanotubes (DWCNTs) can be used. Alternatively, a material other than carbon materials may also be used, as long as the material has good electric conductivity. For example, a metallic material such as a Ni powder, and/or a conductive polymeric material and the like can also be used. Examples of the binder contained in the sulfur electrode used as the positive electrode include fluorine-containing resins such as polyvinylidene fluoride (PVdF) and/or polytetrafluoroethylene (PTFE) and polymeric resins such as a polyvinyl alcohol (PVA)-based resin and/or a styrene-butadiene copolymer rubber (SBR)-based resin. As the binder, a conductive polymer may also be used. As the conductive polymer, for example, a substituted or unsubstituted polyaniline, polypyrrole and polythiophene, and a (co) polymer composed of one or two components selected from these components may be used.

On the other hand, in the electrochemical device of the present technology, the material (specifically, negative electrode active material) constituting the negative electrode is preferably composed of a magnesium metal alone, a magnesium alloy or a magnesium compound, because of an "electrode containing magnesium". When the negative electrode is made of a simple substance of magnesium (for example, magnesium plate or the like), an Mg purity of the simple substance is 90% or more, preferably 95% or more, and more preferably 98% or more. The negative electrode can be produced from, for example, a plate-like material or a foil-like material, but is not limited thereto, and can be formed (shaped) using powder.

The negative electrode may have a structure in which a negative electrode active material layer is formed near a surface thereof. For example, the negative electrode may be such a negative electrode that has, as the negative electrode active material layer, a layer that contains magnesium (Mg), further contains at least one of carbon (C), oxygen (O), sulfur (S) and halogen, and has magnesium ion conductivity. As a mere exemplary category, such a negative electrode active material layer may exhibit a single peak derived from magnesium in a range of 40 eV or more and 60 eV or less. Examples of halogen include at least one selected from the group consisting of fluorine (F), chlorine (Cl), bromine (Br), and iodine (I). In such a case, the negative electrode active material layer may exhibit, over a region from its front surface to a depth of $2\times10^{-7}$ m, a single peak derived from magnesium in the range of 40 eV or more and 60 eV or less. This is because in such a case, the negative electrode active material layer will exhibit good electrochemical activity over the region from the surface to the inside. In addition, for a similar reason, the oxidized state of magnesium may be substantially constant from its front surface to a depth of $2\times10^{-7}$ m in the negative electrode active material layer. Here, a front surface of the negative electrode active material layer means a surface on a side constituting a front surface of the electrode of both surfaces of the negative electrode active material layer, and a back surface of the negative electrode active material layer means a surface on a side opposite to the front surface, that is, a surface on a side constituting an interface between a current collector and the negative electrode active material layer. Whether the negative electrode active material layer contains the elements mentioned above can be confirmed based on XPS (X-ray Photoelectron Spectroscopy) method. In addition, the XPS method may also be used to determine whether the negative electrode active material layer exhibits the peak mentioned above and has the oxidized state of magnesium.

In the electrochemical device of the present technology, preferably, the positive electrode and the negative electrode are separated from each other by an inorganic or organic separator through which magnesium ions can pass, while preventing the occurrence of short circuit due to the contact between the positive electrode and the negative electrode. Examples of inorganic separators include glass filters and glass fibers. Examples of the organic separator include a synthetic resin porous film including polytetrafluoroethylene, polypropylene, and/or polyethylene, and can have a structure in which two or more kinds of these porous films are laminated. Among these, the porous film made of polyolefin is preferable, since such a film has a superior short circuit preventive effect and can improve safety of the battery by shutdown effect.

The electrolyte layer in the electrochemical device can be composed of the electrolytic solution of the present technology and a polymeric compound that is a carrier for carrying the electrolytic solution therein. The polymeric compound may be one that can be swollen with the electrolytic solution. In this case, the polymeric compound swollen with the electrolytic solution may have a gel-like form. Examples of the polymeric compound include polyacrylonitrile, polyvinylidene fluoride, a copolymer of vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, styrene-butadiene rubber, nitrile-butadiene rubber, polystyrene, and/or polycarbonate. Particularly, if the viewpoint of electrochemical stability is more important, the polymeric compound may be polyacrylonitrile, polyvinylidene fluoride, polyhexafluoropropylene, or polyethylene oxide. The electrolyte layer may be a solid electrolyte layer.

The magnesium electrode-based electrochemical device described above can be configured as a secondary battery, and a conceptual diagram in that case is shown in FIG. 1. As shown in the figure, during charging, magnesium ions ($Mg^{2+}$) move from a positive electrode 10 to a negative electrode 11 through an electrolyte layer 12 to convert electrical energy into chemical energy and store electricity. During discharging, the magnesium ions return from the negative electrode 11 to the positive electrode 10 through the electrolyte layer 12 to generate electrical energy.

When the electrochemical device is a battery (primary battery or secondary battery) composed of the electrolytic solution of the present technology, such a battery can be used as a driving power source or an auxiliary power source of, for example, a notebook type personal computer, a personal digital assistant (PDA), a mobile phone, a smart phone, a master unit and a slave unit of cordless phone, a video movie, a digital still camera, an electronic book, an electronic dictionary, a portable music player, a radio, a headphone, a game machine, a navigation system, a memory card, a cardiac pacemaker, a hearing aid, an electric tool, an electric shaver, a refrigerator, an air conditioner, a television receiver, a stereo, a water heater, a microwave oven, a dishwasher, a washing machine, a dryer, a lighting apparatus, a toy, a medical device, a robot, a road conditioner, a traffic light, a railway vehicle, a golf cart, an electric cart, and/or an electric car (including a hybrid car). This battery can also be installed as, for example, a power supply for electric power storage use for an architectural structure including a house or a power-generating facility, or can be used for supplying an electric power to these facilities. A conversion device which receives the supply of an electric power and converts the electric power to a driving force in an electric automobile is generally a motor. An example of a control device (controller) for executing an information processing associated with the control of a vehicle is a control device that can perform the display of a remaining battery level on the basis of the information about the remaining battery level of the battery. The battery can also be used in an electrical storage device in a so-called "smart grid". The electrical storage device can supply an electric power and can also store an electric power when receives the supply of an electric power from other power source. Examples of the "other power source" include thermal power generation, nuclear power generation, hydroelectric power generation, a solar cell, wind power generation, geothermal power generation, and/or a fuel cell (including a biofuel cell).

The electrochemical device (that is, secondary battery) of the present technology can be applied to a secondary battery, a control unit (or controller) for controlling a secondary battery, and a battery pack having an exterior enclosing the secondary battery. In the battery pack, the control means can perform, for example, the control of charging/discharging, over-discharging or over-charging associated with the secondary battery.

The electrochemical device (that is, secondary battery) of the present technology can also be applied to an electronic device that receives the supply of an electric power from a secondary battery.

The electrochemical device of the present technology can also be applied to a secondary battery in an electric vehicle including a conversion device for converting electric power supplied from the secondary battery into a driving force of the vehicle and a control device (or controller) for performing information processing related to vehicle control based on information on the secondary battery. In this electric vehicle, the conversion device typically receives electric power from the secondary battery, drives a motor, and generates a driving force. Driving of the motor can also use regenerative energy. Furthermore, for example, the control device (or controller) performs information processing on vehicle control based on the remaining amount of a secondary battery. Examples of such an electric vehicle include a so-called hybrid car in addition to an electric car, an electric motorcycle, an electric bicycle, and a railway vehicle.

The electrochemical device (that is, secondary battery) of the present technology can be applied to a power system configured to receive the supply of an electric power from a secondary battery and/or supply the electric power from a power source to the secondary battery. The power system as described above may be any power system as long as the system uses electric power, and includes a simple electric power device. Examples of such an electric power system include a smart grid, a home energy management system (HEMS), and/or a vehicle. The electric power system can also store electricity.

The electrochemical device (that is, secondary battery) of the present technology can be applied to a power storage power source configured to have a secondary battery and be connected to an electronic device to which electric power is supplied. This power storage power source can be basically used for any power system or power device regardless of application of the power storage power source, but can be used for a smart grid, for example.

Other details such as more detailed matters and further specific aspects of the electrochemical device of the present technology are described in [Electrolytic solution for electrochemical device of the present technology] mentioned above, and therefore the description thereof is omitted to avoid duplication.

Here, a case where the magnesium electrode-based electrochemical device of the present technology is provided as a secondary battery will be described in more detail. Hereinafter, such a secondary battery is also referred to as a "magnesium secondary battery".

The magnesium secondary battery as the electrochemical device of the present technology can be applied to a machine, a device, an appliance, an apparatus, and a system (an assembly of a plurality of devices or the like) which can be used as a power source for driving/operating the secondary battery or a power storage source for accumulating power without any particular limitation. The magnesium secondary battery (for example, magnesium-sulfur secondary battery) used as a power source may be a main power source (power source used preferentially) or an auxiliary power source (power source used in place of a main power source, or by switching from the main power source). In a case of using a magnesium secondary battery as an auxiliary power source, a main power source is not limited to a magnesium secondary battery.

Specific examples of an application of the magnesium secondary battery (particularly, magnesium-sulfur secondary battery) include various electronic devices and electrical devices (including portable electronic devices) such as a video camera, a camcorder, a digital still camera, a mobile phone, a personal computer, a television receiver, various display devices, a cordless phone, a headphone stereo, a music player, a portable radio, electronic paper such as an electronic book and/or an electronic newspaper, or a portable information terminal including PDA; a toy; a portable living appliance such as an electric shaver; a lighting appliance such as an interior light; a medical electronic device such as a pacemaker and/or a hearing aid; a storage device such as a memory card; a battery pack used as a detachable power source for a personal computer or the like; an electric tool such as an electric drill and/or an electric saw; a power storage system and/or a home energy server (household power storage device) such as a household battery system for accumulating electric power in preparation for emergency or the like and a power supply system; a power storage unit and/or a backup power source; an electric vehicle such as an electric car, an electric motorcycle, an electric bicycle, and/or Segway (registered trademark); and a power driving force conversion device of an airplane and/or a ship (specifically, for example, a power motor), but are not limited to these applications.

Among these applications, the magnesium secondary battery (particularly, magnesium-sulfur secondary battery) is effectively applied to a battery pack, an electric vehicle, a power storage system, a power supply system, an electric tool, an electronic device, and/or an electrical device. The battery pack is a power source using the magnesium secondary battery, and is a so-called assembled battery or the like. The electric vehicle is a vehicle which operates (for example, travels) using the magnesium secondary battery as a driving power source, and may be a car (for example, hybrid car or the like) also including a drive source other than the secondary battery. The power storage system (for example, power supply system) is a system using the magnesium secondary battery as a power storage source. For example, in the household power storage system (power supply system), power is accumulated in the magnesium secondary battery as a power storage source, and therefore household electrical products or the like can be used using electric power. The electric tool is a tool in which a movable portion (such as a drill) can move using the magnesium secondary battery as a driving power source. The electronic device and the electrical device are devices that exhibit various functions using the magnesium secondary battery as a power source (that is, power supply source) for operation.

Hereinafter, a cylinder type magnesium secondary battery and a flat plate type laminated film type magnesium secondary battery will be described.

Figure 2:
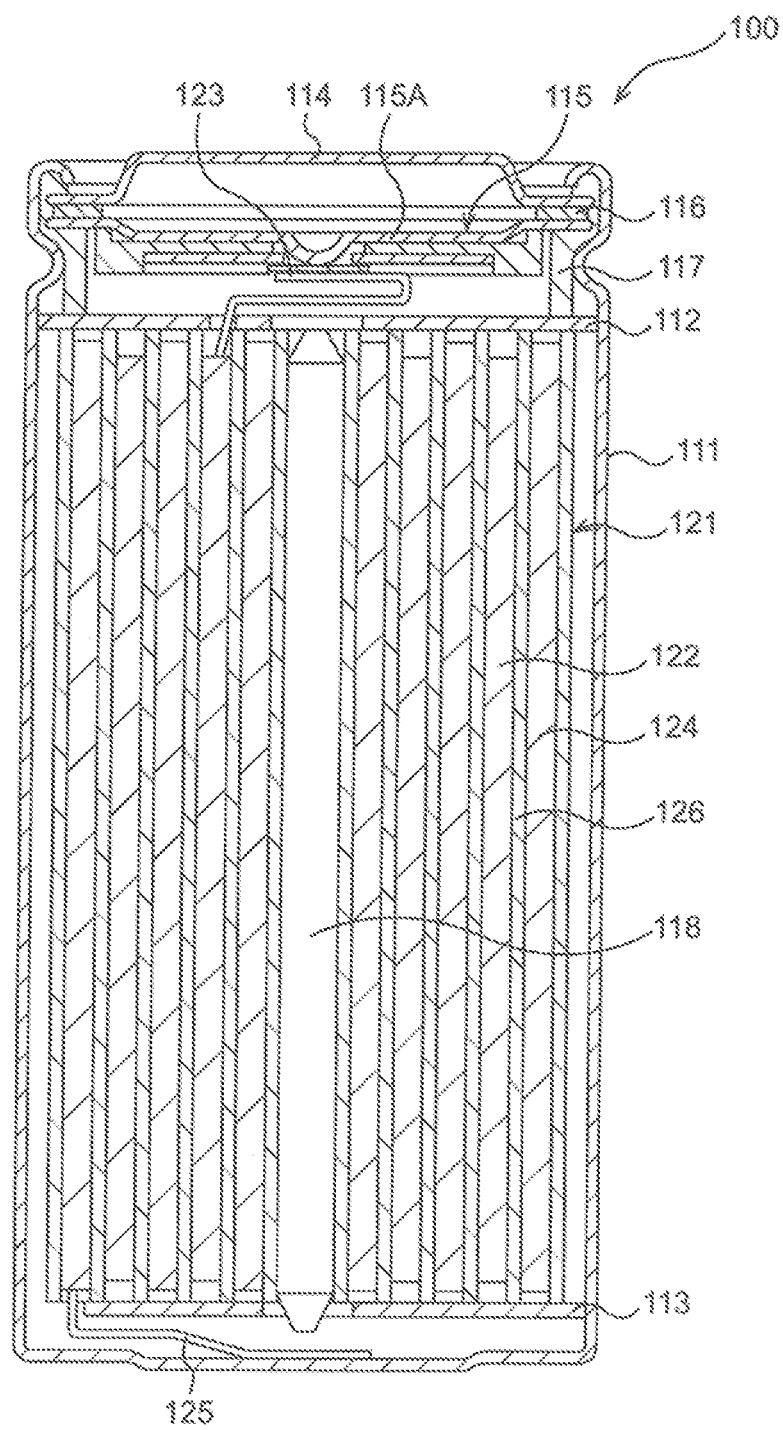
FIG. 2 is a schematic sectional view of a magnesium secondary battery (cylindrical magnesium secondary battery) provided as an embodiment of the present technology.

FIG. 2 shows a schematic sectional view of a cylinder type magnesium secondary battery 100. In the magnesium secondary battery 100, an electrode structure 121 and a pair of insulating plates 112, 113 are housed inside an electrode structure housing member 111 that has a substantially hollow cylindrical shape. The electrode structure 121 can be manufactured, for example, by stacking a positive electrode 122 and a negative electrode 124 with a separator 126 interposed therebetween to obtain an electrode structure and then winding the electrode structure. The electrode structure housing member (for example, battery can) 111 has a hollow structure in which one end is closed and the other end is open, and includes iron (Fe), and/or aluminum (Al). The pair of insulating plates 112, 113 is arranged so as to sandwich the electrode structure 121 and to extend perpendicularly to a winding peripheral surface of the electrode structure 121. A battery lid 114, a safety valve mechanism 115, and a positive temperature coefficient device (for example, PTC device) 116 are crimped to the open end of the electrode structure housing member 111 through a gasket 117, and the electrode structure housing member 111 is thereby sealed. For example, the battery lid 114 is manufactured from the same material as that of the electrode structure housing member 111. The safety valve mechanism 115 and the positive temperature coefficient device 116 are provided inside the battery lid 114, and the safety valve mechanism 115 is electrically connected to the battery lid 114 through the positive temperature coefficient device 116. In the safety valve mechanism 115, when an internal pressure becomes a certain level or higher due to internal short circuit and/or external heating, a disk plate 115A is inverted. As a result, the electrical connection between the battery lid 114 and the electrode structure 121 is disconnected. In order to prevent abnormal heat generation due to a large amount of current, resistance of the positive temperature coefficient device 116 increases with an increase in temperature. The gasket 117 is formed from, for example, an insulating material. A surface of the gasket 117 may be coated with asphalt or the like.

A center pin 118 is inserted into a winding center of the electrode structure 121. However, the center pin 118 may not be inserted into the winding center. A positive electrode lead portion 123 manufactured from a conductive material such as aluminum is connected to the positive electrode 122. Specifically, the positive electrode lead portion 123 is attached to a positive electrode current collector. A negative electrode lead portion 125 manufactured from a conductive material such as copper is connected to the negative electrode 124. Specifically, the negative electrode lead portion 125 is attached to a negative electrode current collector. The negative electrode lead portion 125 is welded to the electrode structure housing member 111 and is electrically connected to the electrode structure housing member 111. The positive electrode lead portion 123 is welded to the safety valve mechanism 115 and is electrically connected to the battery lid 114. Incidentally, in the example shown in FIG. 2, the negative electrode lead portion 125 is disposed at one place (outermost peripheral portion of the wound electrode structure), but may be disposed at two places (outermost peripheral portion and innermost peripheral portion of the wound electrode structure).

The electrode structure 121 includes the positive electrode 122 having a positive electrode active material layer formed on the positive electrode current collector (more specifically, on both surfaces of the positive electrode current collector) and the negative electrode 124 having a negative electrode active material layer formed on the negative electrode current collector (more specifically, on both surfaces of the negative electrode current collector) stacked with the separator 126 interposed therebetween. The positive electrode active material layer is not formed in a region of the positive electrode current collector to which the positive electrode lead portion 123 is attached. The negative electrode active material layer is not formed in a region of the negative electrode current collector to which the negative electrode lead portion 125 is attached.

For example, the magnesium secondary battery 100 can be manufactured based on the following procedure.

First, positive electrode active material layers are formed on both surfaces of the positive electrode current collector, and negative electrode active material layers are formed on both surfaces of the negative electrode current collector.

Then, the positive electrode lead portion 123 is attached to the positive electrode current collector using a welding method or the like. Furthermore, the negative electrode lead portion 125 is attached to the negative electrode current collector using a welding method or the like. Subsequently, the positive electrode 122 and the negative electrode 124 are stacked with a microporous polyethylene film separator 126 interposed therebetween, and are wound (more specifically, the electrode structure (that is, stacked structure) of the positive electrode 122/separator 126/negative electrode 124/separator 126 is wound) to manufacture the electrode structure 121. Thereafter, a protective tape (not shown) is adhered to an outermost peripheral portion. Thereafter, the center pin 118 is inserted into a center of the electrode structure 121. Subsequently, the electrode structure 121 is housed inside the electrode structure housing member 111 while the electrode structure 121 is sandwiched between the pair of insulating plates 112 and 113. In this case, a tip end of the positive electrode lead portion 123 is attached to the safety valve mechanism 115, and a tip end of the negative electrode lead portion 125 is attached to the electrode structure housing member 111 using a welding method or the like. Thereafter, the electrolytic solution is injected based on a depressurization method, and the separator 126 is impregnated with the electrolytic solution. Subsequently, the battery lid 114, the safety valve mechanism 115, and the positive temperature coefficient device 116 are crimped to an open end of the electrode structure housing member 111 via the gasket 117.

Figure 3:
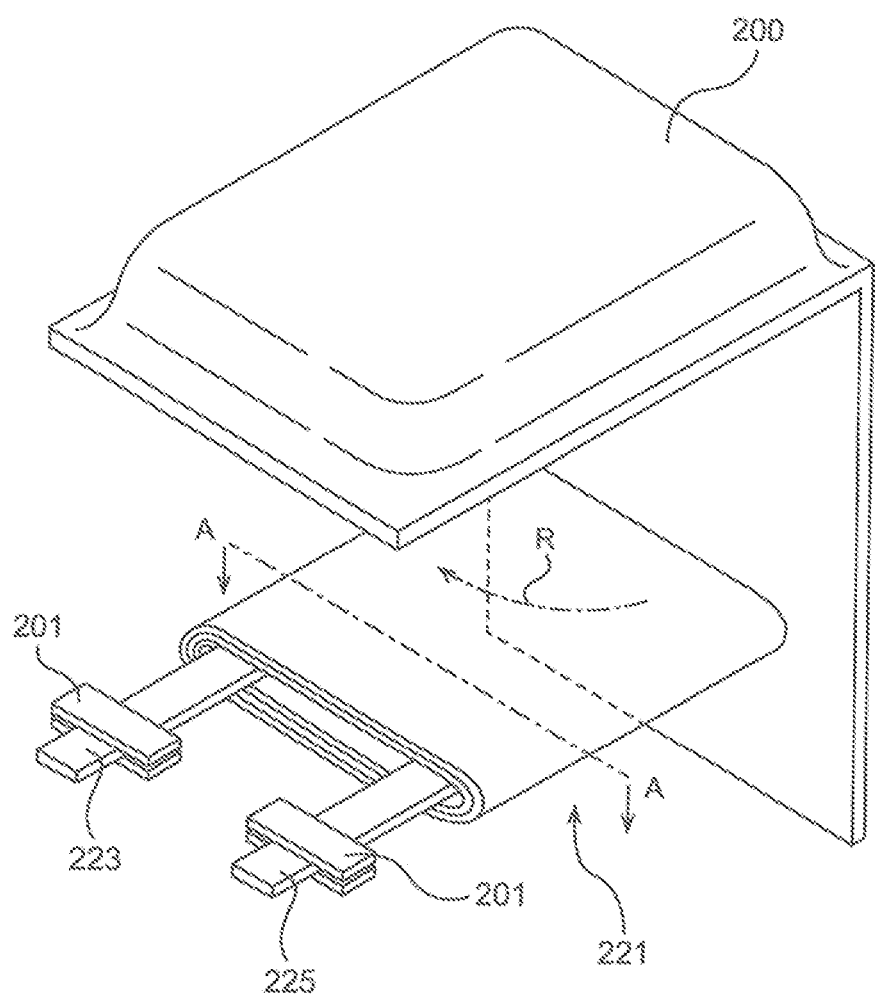
FIG. 3 is a schematic perspective view of a magnesium secondary battery (flat plate type laminated film type magnesium secondary battery) provided as an embodiment of the present technology.

Next, a flat plate type laminated film type secondary battery will be described. FIG. 3 shows a schematic exploded perspective view of such a secondary battery. In this secondary battery, an electrode structure 221 basically similar to that described above is housed inside an exterior member 200 including a laminated film. The electrode structure 221 can be manufactured by stacking a positive electrode and a negative electrode with a separator and an electrolyte layer interposed therebetween, and then winding this stacked structure. A positive electrode lead portion 223 is attached to the positive electrode, and a negative electrode lead portion 225 is attached to the negative electrode. An outermost peripheral portion of the electrode structure 221 is protected by a protective tape. The positive electrode lead portion 223 and the negative electrode lead portion 225 protrude in the same direction from the inside to the outside of the exterior member 200. The positive electrode lead portion 223 includes a conductive material such as aluminum. The negative electrode lead portion 225 includes a conductive material such as copper, nickel, and/or stainless steel.

The exterior member 200 is a single film foldable in a direction of the arrow R shown in FIG. 3, and has a recess (for example, emboss) for housing the electrode structure 221 in a part of the exterior member 200. The exterior member 200 is a laminated film in which a fusion-bonding layer, a metal layer, and a surface protective layer are stacked in this order, for example. In a step of manufacturing the secondary battery, the exterior member 200 is folded such that the fusion layers face each other through the electrode structure 221, and then outer peripheral edges of the fusion layers are fused to each other. However, the exterior member 200 may be obtained by bonding two separate laminated films to each other using an adhesive or the like. For example, the fusion layer includes a film of polyethylene and/or polypropylene. For example, the metal layer includes an aluminum foil or the like. For example, the surface protective layer includes nylon and/or polyethylene terephthalate. In particular, the exterior member 200 is preferably an aluminum laminated film in which a polyethylene film, an aluminum foil, and a nylon film are stacked in this order. However, the exterior member 200 may be a laminated film having any other laminated structure, a polymer film such as polypropylene, or a metal film. Specifically, the exterior member 200 may include a moisture-resistant aluminum laminated film obtained by laminating a nylon film, an aluminum foil, and an unstretched polypropylene film in this order from outside.

In order to prevent entry of outside air, an adhesive film 201 is inserted between the exterior member 200 and the positive electrode lead portion 223 and between the exterior member 200 and the negative electrode lead portion 225. The adhesive film 201 may include a material having adhesion to the positive electrode lead portion 223 and the negative electrode lead portion 225, for example, a polyolefin resin, more specifically, a polyolefin resin such as polyethylene, polypropylene, modified polyethylene, modified polypropylene, or the like.

Although the above description has focused primarily on secondary batteries, the present disclosure also applies to other electrochemical devices such as capacitors, air batteries and fuel cells. This will be described below.

Figure 4:
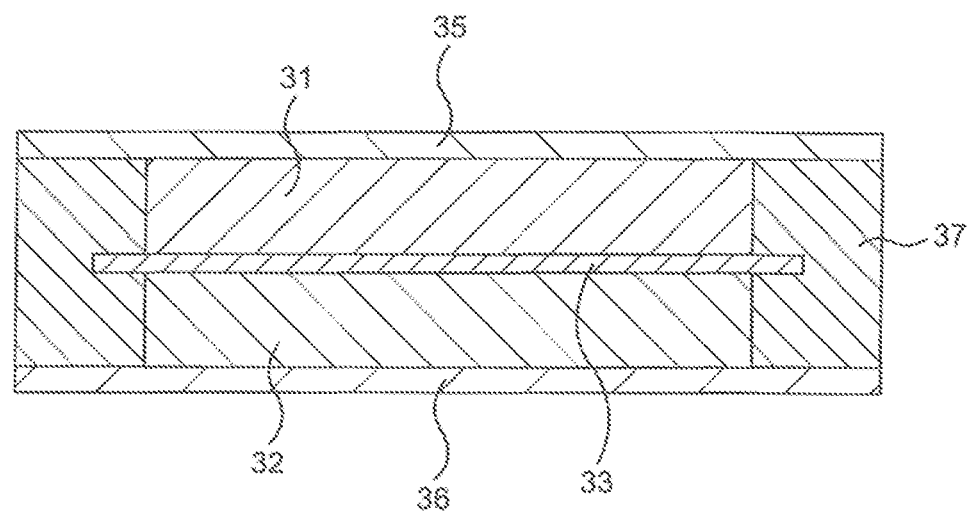
FIG. 4 is a schematic sectional view of the electrochemical device provided as a capacitor in an embodiment of the present technology.

The electrochemical device of the present technology can be provided as a capacitor as shown in the schematic sectional view of FIG. 4. In the capacitor, a positive electrode 31 and a negative electrode 32 are arranged so as to face each other via a separator 33 impregnated with the electrolytic solution. A gel electrolyte membrane impregnated with the electrolytic solution of the present technology may be placed on a surface of at least one of the separator 33, the positive electrode 31 and the negative electrode 32.

Reference numerals 35 and 36 indicate current collectors, and reference numeral 37 indicates a gasket.

Figure 5:
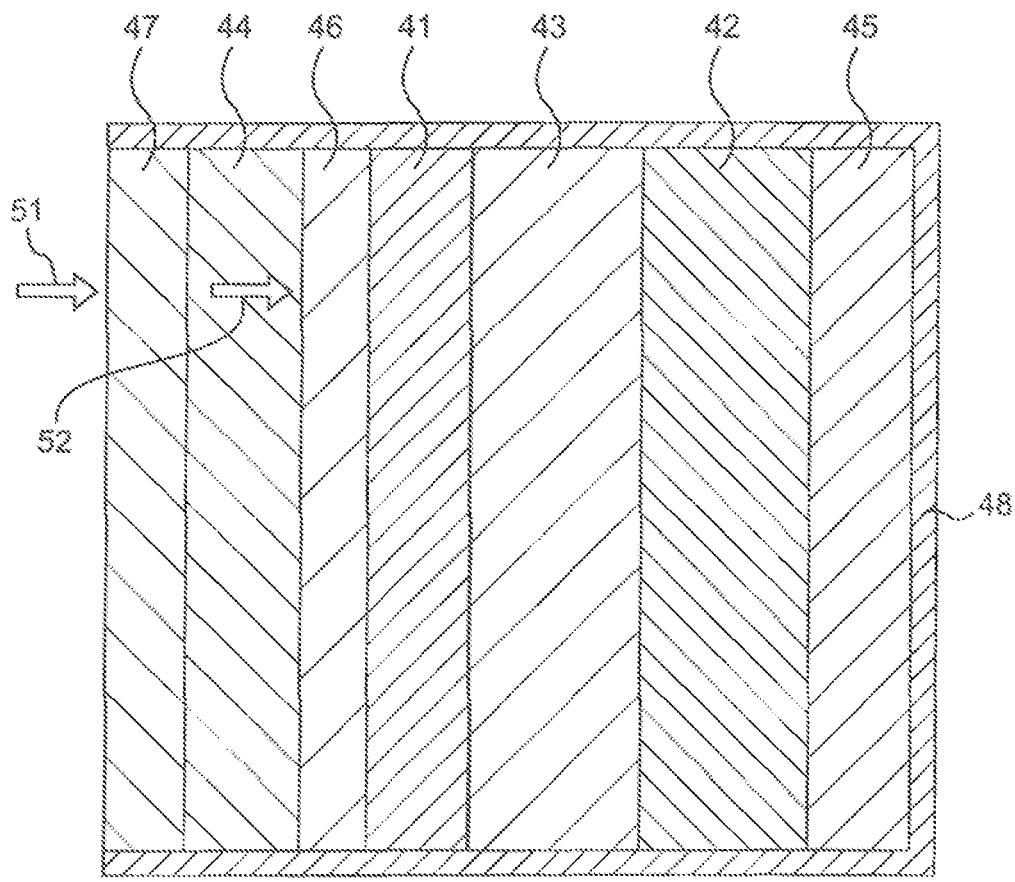
FIG. 5 is a schematic sectional view of the electrochemical device provided as an air battery in an embodiment of the present technology.

Alternatively, the electrochemical device of the present technology can also be provided as an air battery, as shown in the conceptual diagram of FIG. 5. Such an air battery is composed of, for example, an oxygen-selective permeable membrane 47 through which water vapor hardly permeates and oxygen can permeate selectively, an air-electrode-side current collector 44 which is made from a conductive porous material, a porous diffusion layer 46 which is arranged between the air-electrode-side current collector 44 and a porous positive electrode 41 and is made from a conductive material, the porous positive electrode 41 which contains a conductive material and a catalyst material, a separator through which water vapor hardly permeates and an electrolytic solution (or a solid electrolyte containing an electrolytic solution) 43, a negative electrode 42 which can release magnesium ions, a negative-electrode-side current collector 45, and an exterior body 48 in which these layers are housed.

Oxygen 52 in an air atmosphere (for example, atmospheric air) 51 selectively permeates through the oxygen-selective permeable membrane 47, then passes through the air-electrode-side current collector 44 made from a porous material, is then diffused by the diffusion layer 46, and is then supplied to the porous positive electrode 41. The flow of oxygen that has passed through the oxygen-selective permeable membrane 47 is blocked by the air-electrode-side current collector 44 in part. However, oxygen that has passed through the air-electrode-side current collector 44 is diffused by the diffusion layer 46 and is then spread, and therefore the oxygen can be spread throughout the porous positive electrode 41 efficiently and the supply of the oxygen to the whole surface of the porous positive electrode 41 is never inhibited by the air-electrode-side current collector 44. In addition, since the permeation of water vapor is inhibited by the oxygen-selective permeable membrane 47, the deterioration of the battery due to the influence of water contained in an air atmosphere can be reduced, oxygen can be supplied throughout the porous positive electrode 41 efficiently, a battery output can be improved, and therefore the battery can be used stably for a long period.

Figure 6:
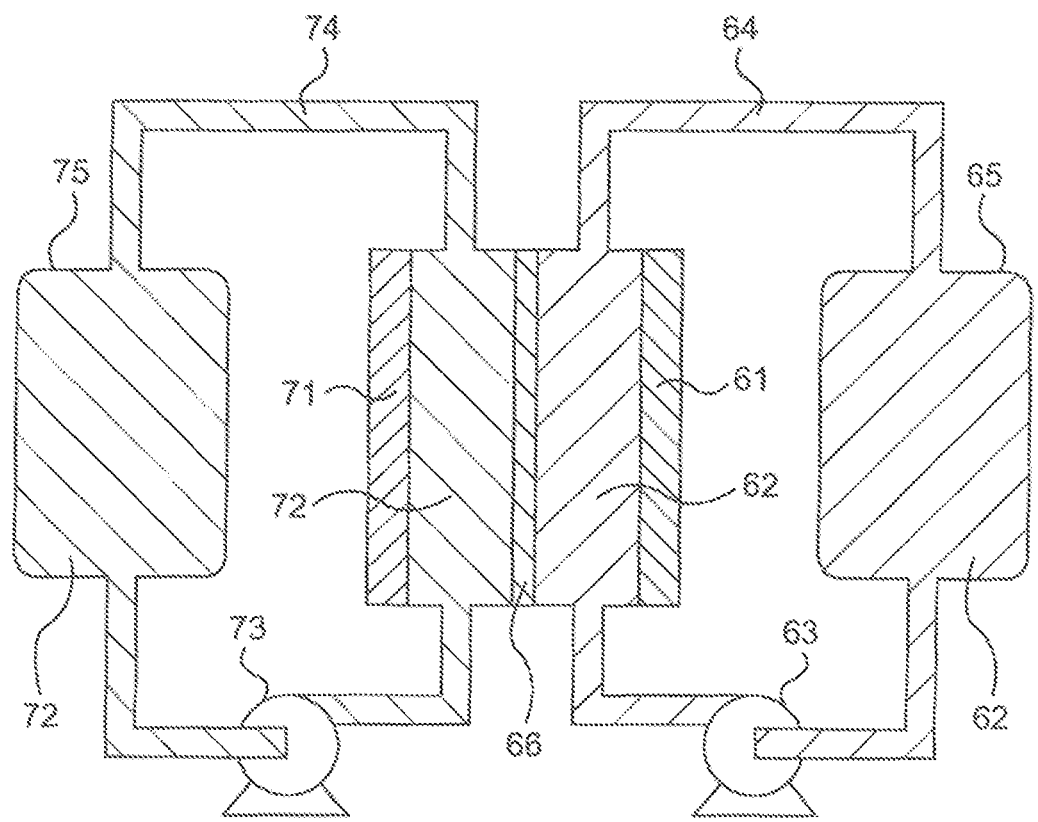
FIG. 6 is a schematic sectional view of the electrochemical device provided as a fuel cell in an embodiment of the present technology.

Alternatively, the electrochemical device of the present technology can also be provided as a fuel cell, as shown in the conceptual diagram of FIG. 6. The fuel cell includes, for example, a positive electrode 61, a positive electrode electrolytic solution 62, a pump 63 for feeding the positive electrode electrolytic solution, a fuel passage 64, a vessel 65 for storing the positive electrode electrolytic solution, a negative electrode 71, a negative electrode electrolytic solution 72, a pump 73 for feeding the negative electrode electrolytic solution, a fuel passage 74, a vessel 75 for storing the negative electrode electrolytic solution, and an ion-exchange membrane 66. The positive electrode electrolytic solution 62 is allowed to flow (circulate) continuously or intermittently into the fuel passage 64 through the vessel 65 for storing the positive electrode electrolytic solution and the pump 63 for feeding the positive electrode electrolytic solution. The negative electrode electrolytic solution 72 is allowed to flow or circulate continuously or intermittently into the fuel passage 74 through the vessel 75 for storing the negative electrode electrolytic solution and the pump 73 for feeding the negative electrode electrolytic solution. Electric power is generated between the positive electrode 61 and the negative electrode 71. A material obtained by adding a positive electrode active material to the electrolytic solution of the present technology may be used as the positive electrode electrolytic solution 62. A material obtained by adding a negative electrode active material to the electrolytic solution of the present technology may be used as the negative electrode electrolytic solution 72.

As for the negative electrode in the electrochemical device, an Mg metal plate can be used, and the negative electrode can also be produced by the following method. For example, an Mg electrolytic solution (Mg-EnPS) containing $MgCl_2$ and EnPS (ethyl-n-propyl sulfone) is provided, this Mg electrolytic solution is used to precipitate Mg metal on a Cu foil based on an electrolytic plating method, and as the negative electrode active material layer, an Mg plating layer may be formed on the Cu foil. As a result of analyzing a surface of the Mg plating layer, obtained by such a method, based on the XPS method, it became clear that Mg, C, O, S and Cl were present on the surface of the Mg plating layer, an Mg-derived peak observed by surface analysis was not split, and a single peak derived from Mg was observed in the range of 40 eV or more and 60 eV or less. Furthermore, the surface of the Mg plating layer was drilled in a depth direction by about 200 nm based on an Ar sputtering method, and the surface was analyzed based on the XPS method. As a result, it was determined that the position and shape of the Mg-derived peak after Ar sputtering had no change when compared to the position and shape of the peak before Ar sputtering.

Although the electrochemical device according to the present technology can be particularly used as a magnesium secondary battery as described with reference to FIGS. 1 to 3, several application examples of such a magnesium secondary battery will be more specifically described. Incidentally, configurations of application examples described below are merely examples, and can be appropriately changed.

A magnesium secondary battery can be used in the form of battery pack. Such a battery pack is a simple type battery pack (so-called soft pack) using the magnesium secondary battery, and is mounted on an electronic device typified by a smartphone, for example. Alternatively or additionally, the battery pack may include an assembled battery including six magnesium secondary batteries connected in two parallel and three series. Incidentally, the connection form of the magnesium secondary batteries may be a series form, a parallel form, or a mixed form thereof.

Figure 7:
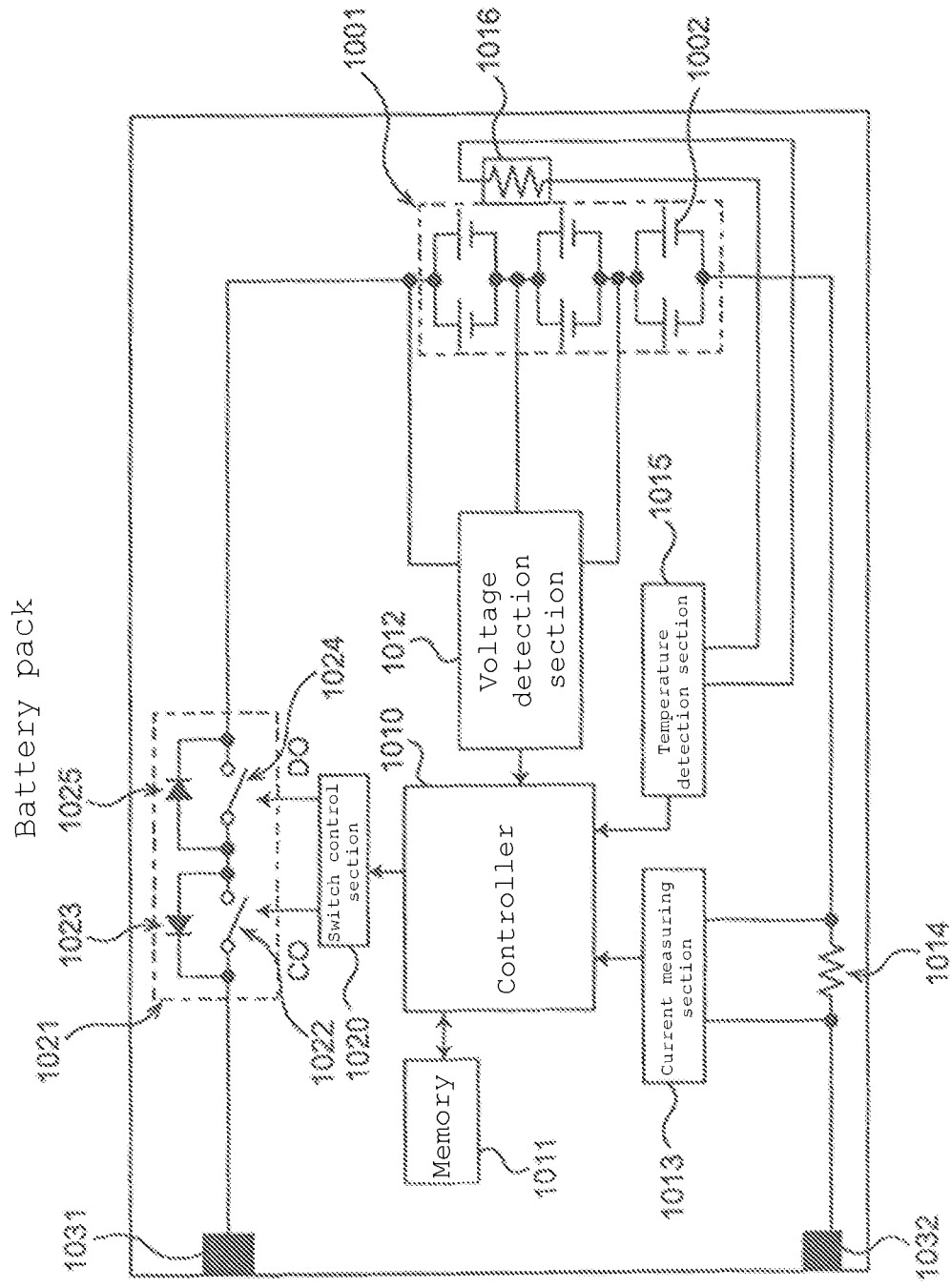
FIG. 7 is a block diagram showing a circuit configuration example in a case where the magnesium secondary battery provided as an embodiment of the present technology is applied to a battery pack.

FIG. 7 shows a block diagram showing a circuit configuration example in a case where the magnesium secondary battery of the present technology is applied to a battery pack. The battery pack includes a cell (for example, assembled battery) 1001, an exterior member, a switch section 1021, a current detection resistor 1014, a temperature detection element 1016, and a controller 1010. The switch section 1021 includes a charge control switch 1022 and a discharge control switch 1024. Furthermore, the battery pack includes a positive electrode terminal 1031 and a negative electrode terminal 1032. At the time of charging, the positive electrode terminal 1031 and the negative electrode terminal 1032 are connected to a positive electrode terminal and a negative electrode terminal of a charger, respectively, and are charged. Furthermore, at the time of using an electronic device, the positive electrode terminal 1031 and the negative electrode terminal 1032 are connected to a positive electrode terminal and a negative electrode terminal of the electronic device, respectively, and are discharged.

The cell 1001 is constituted by connecting a plurality of magnesium secondary batteries 1002 in the present disclosure in series and/or in parallel. Incidentally, FIG. 7 shows a case where the six magnesium secondary batteries 1002 are connected in two parallel and three series (2P3S). However, any other connection method such as p parallel and q series (where p and q are integers) may be used.

The switch section 1021 includes the charge control switch 1022, a diode 1023, the discharge control switch 1024, and a diode 1025, and is controlled by the controller 1010. The diode 1023 has a backward polarity with respect to a charge current flowing in a direction from the positive electrode terminal 1031 to the cell 1001, and a forward polarity with respect to a discharge current flowing in a direction from the negative electrode terminal 1032 to the cell 1001. The diode 1025 has a forward polarity with respect to the charge current and a backward polarity with respect to the discharge current. Incidentally, in the example, the switch section is disposed on a plus (+) side, but may be disposed on a minus (−) side. The controller 1010 controls the charge control switch 1022 such that the charge control switch 1022 is closed in a case where a battery voltage reaches an overcharge detection voltage, and no charge current flows in a current path of the cell 1001. After the charge control switch 1022 is closed, only discharge can be performed through the diode 1023. Furthermore, the controller 1010 controls the charge control switch 1022 such that the charge control switch 1022 is closed in a case where a large amount of current flows during charging, and a charge current flowing in a current path of the cell 1001 is cut off. The controller 1010 controls the discharge control switch 1024 such that the discharge control switch 1024 is closed in a case where a battery voltage reaches an overdischarge detection voltage, and no discharge current flows in a current path of the cell 1001. After the discharge control switch 1024 is closed, only charge can be performed through the diode 1025. Furthermore, the controller 1010 controls the discharge control switch 1024 such that the discharge control switch 1024 is closed in a case where a large amount of current flows during discharging, and a discharge current flowing in a current path of the cell 1001 is cut off.

For example, the temperature detection element 1016 includes a thermistor, and is disposed in the vicinity of the cell 1001. A temperature measuring section 1015 measures the temperature of the cell 1001 using the temperature detection element 1016, and sends the measurement result to the controller 1010. A voltage measuring section 1012 measures the voltage of the cell 1001 and the voltage of each of the magnesium secondary batteries 1002 constituting the cell 1001, performs A/D conversion of the measurement result, and sends the converted result to the controller 1010. A current measuring section 1013 measures a current using the current detection resistor 1014, and sends the measurement result to the controller 1010.

A switch control section 1020 controls the charge control switch 1022 and the discharge control switch 1024 of the switch section 1021 based on a voltage and a current sent from the voltage measuring section 1012 and the current measuring section 1013. When a voltage of any one of the magnesium secondary batteries 1002 becomes equal to or lower than the overcharge detection voltage or overdischarge detection voltage, and/or when a large amount of current rapidly flows, the switch control section 1020 sends a control signal to the switch section 1021, and thereby prevents overcharge, overdischarge, and overcurrent charge/discharge. The charge control switch 1022 and the discharge control switch 1024 can be constituted by a semiconductor switch such as a MOSFET. In this case, the diodes 1023, 1025 are constituted by parasitic diodes of a MOSFET. In a case where a p-channel type FET is used as a MOSFET, the switch control section 1020 supplies a control signal DO and a control signal CO to a gate of each of the charge control switch 1022 and the discharge control switch 1024. The charge control switch 1022 and the discharge control switch 1024 become conductive due to a gate potential lower than a source potential by a predetermined value or more. That is, in normal charging and discharging operation, each of the control signal CO and the control signal DO is set to a low level, and the charge control switch 1022 and the discharge control switch 1024 are caused to be conductive. In addition, for example, during overcharge or overdischarge, each of the control signal CO and the control signal DO is set to a high level, and the charge control switch 1022 and the discharge control switch 1024 are closed.

For example, a memory 1011 includes an EPROM (Erasable Programmable Read Only Memory) which is a non-volatile memory. In the memory 1011, a numerical value calculated by the controller 1010, and/or an internal resistance value of each of the magnesium secondary batteries 1002 in an initial state, measured at a stage of a manufacturing step, etc. are previously stored, and can be rewritten appropriately. Furthermore, by causing the memory 1011 to store a full charge capacity of each of the magnesium secondary batteries 1002, the memory 1011 can calculate a remaining capacity together with the controller 1010, for example.

The temperature measuring section 1015 measures a temperature using the temperature detection element 1016, performs charge/discharge control at the time of abnormal heat generation, and performs correction in calculating the remaining capacity.

Figure 8A:
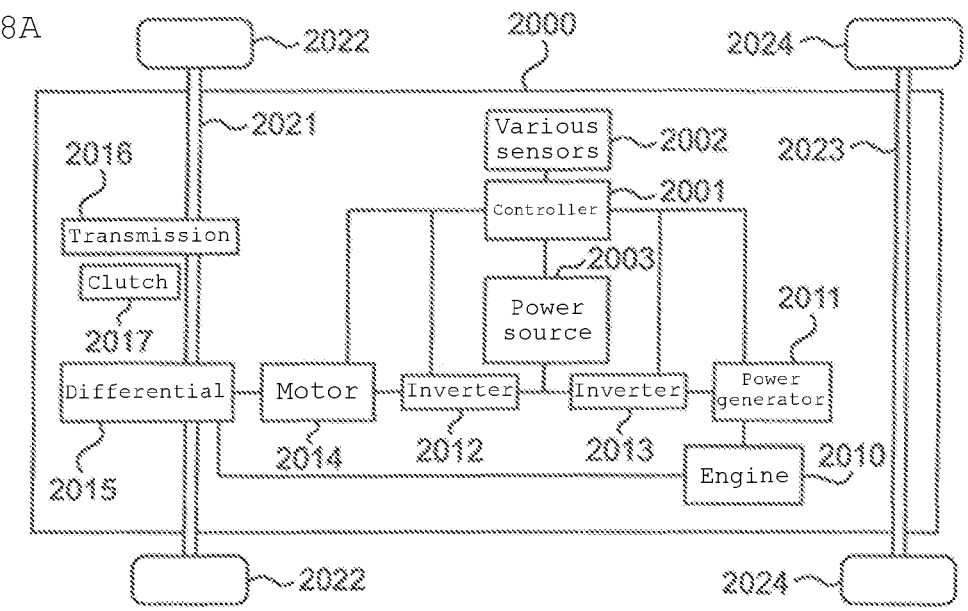
FIG. 8A is a block diagram showing a configuration of an electric vehicle to which the magnesium secondary battery is applied as an embodiment of the present technology.

Next, the application of the magnesium secondary battery to an electric vehicle will be described. FIG. 8A shows a block diagram showing a configuration of an electric vehicle such as a hybrid car which is an example of an electric vehicle. For example, the electric vehicle includes a controller 2001, various sensors 2002, a power source 2003, an engine 2010, a power generator 2011, inverters 2012, 2013, a driving motor 2014, a differential 2015, a transmission 2016, and a clutch 2017 in a housing 2000 made of metal. In addition, for example, the electric vehicle includes a front wheel drive shaft 2021, front wheels 2022, a rear wheel drive shaft 2023, and rear wheels 2024 connected to the differential 2015 and/or the transmission 2016.

For example, the electric vehicle can travel using either the engine 2010 or the motor 2014 as a drive source. The engine 2010 is a main power source, and is, for example, a gasoline engine. In a case where the engine 2010 is used as a power source, for example, a driving force (for example, rotational force) of the engine 2010 is transmitted to the front wheels 2022 or the rear wheels 2024 through the differential 2015, the transmission 2016, and the clutch 2017 which are drive units. The rotational force of the engine 2010 is also transmitted to the power generator 2011. The power generator 2011 generates AC power using the rotational force. The AC power is converted into DC power through the inverter 2013. The DC power is accumulated in the power source 2003. Meanwhile, in a case where the motor 2014 which is a conversion section is used as a power source, electric power (for example, DC power) supplied from the power source 2003 is converted into AC power through the inverter 2012, and the motor 2014 is driven using the AC power. The driving force (for example, rotational force) converted from the electric power by the motor 2014 is transmitted to the front wheels 2022 or the rear wheels 2024 through the differential 2015, the transmission 2016, and the clutch 2017 which are drive sections, for example.

When the electric vehicle decelerates by a brake mechanism (not shown), a resistance force at the time of deceleration is transmitted to the motor 2014 as a rotational force, and the motor 2014 may generate AC power using this rotational force. The AC power is converted into DC power through the inverter 2012, and the DC regenerative power is accumulated in the power source 2003.

The controller 2001 controls operation of the entire electric vehicle, and includes a CPU, for example. The power source 2003 can include one or two or more magnesium secondary batteries (not shown) according to the present technology. The power source 2003 may have a configuration to accumulate electric power by being connected to an external power source and receiving electric power from the external power source. For example, the various sensors 2002 are used in order to control the number of revolutions of the engine 2010 and to control an opening degree of a throttle valve (throttle opening degree) (not shown). The various sensors 2002 include a speed sensor, an acceleration sensor, and/or an engine speed sensor, for example.

Incidentally, a case where the electric vehicle is a hybrid car has been described. However, the electric vehicle may be a vehicle (for example, electric car) which operates using only the power source 2003 and the motor 2014 without using the engine 2010.

Figure 8B:
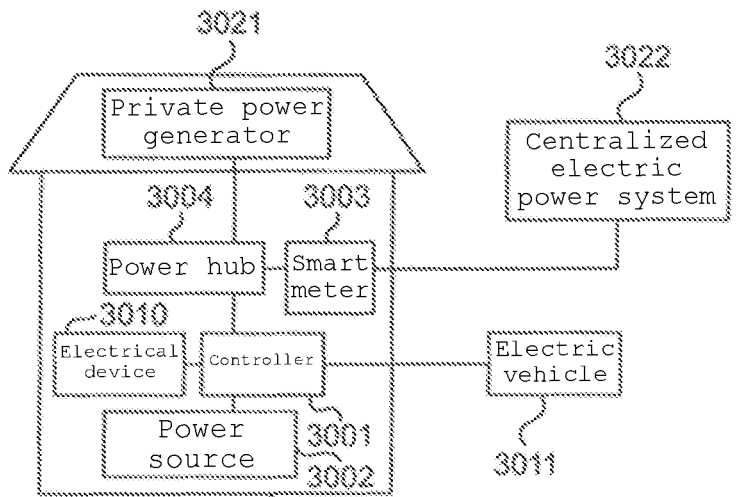
FIG. 8B is a block diagram showing a configuration of a power storage system to which the magnesium secondary battery is applied as an embodiment of the present technology.

Next, the application of the magnesium secondary battery to a power storage system (for example, power supply system) will be described. FIG. 8B shows a block diagram showing a configuration of a power storage system (for example, power supply system). For example, the power storage system includes a controller 3001, a power source 3002, a smart meter 3003, and a power hub 3004 inside a house 3000 such as a general house or a commercial building.

For example, the power source 3002 is connected to an electrical device (for example, electronic device) 3010 installed inside the house 3000, and can be connected to an electric vehicle 3011 which parks outside the house 3000. Furthermore, for example, the power source 3002 is connected to a private power generator 3021 installed in the house 3000 through a power hub 3004, and can be connected to an external centralized electric power system 3022 through the smart meter 3003 and the power hub 3004. For example, the electrical device (for example, electronic device) 3010 includes one or two or more household electric appliances. Examples of the household electric appliances include a refrigerator, an air conditioner, a television receiver, and/or a water heater. For example, the private power generator 3021 is constituted by a solar power generator and/or a wind power generator. Examples of the electric vehicle 3011 include an electric car, a hybrid car, an electric motorcycle, an electric bicycle, and/or a Segway (registered trademark). Examples of the centralized electric power system 3022 include a commercial power source, a power generation device, a power transmission network, and/or a smart grid (for example, next generation power transmission network). Furthermore, examples thereof include a thermal power plant, a nuclear power plant, a hydraulic power plant, and/or a wind power plant. Examples of the power generation device included in the centralized electric power system 3022 include various solar batteries, a fuel battery, a wind power generation device, a micro hydraulic power generation device, and/or a geothermal power generation device. However, the centralized electric power system 3022 and the power generation device are not limited thereto.

The controller 3001 controls operation of the entire power storage system (including a used state of the power source 3002), and includes a CPU, for example. The power source 3002 can include one or two or more magnesium secondary batteries (not shown) according to the present technology. The smart meter 3003 is, for example, an electric power meter that is compatible with a network and is provided in the house 3000 demanding electric power, and may be communicable with an electric power supplier. In addition, for example, the smart meter 3003 controls balance between supply and demand in the house 3000 while communicating with outside, thereby allowing efficient and stable supply of energy.

In such an electric power storage system, for example, electric power may be accumulated in the electric power source 3002 from the concentrating electric power system 3022 as an external electric power source through the smart meter 3003 and the power hub 3004, and electric power is accumulated in the electric power source 3002 from the private power generator 3021 as an independent electric power source through the power hub 3004. The electric power accumulated in the power source 3002 is supplied to the electrical device (for example, electronic device) 3010 and the electric vehicle 3011 according to an instruction of the controller 3001. Therefore, the electrical device (for example, electronic device) 3010 can be operated, and the electric vehicle 3011 can be charged. That is, the power storage system is a system which makes it possible to accumulate and supply electric power in the house 3000 using the power source 3002.

The electric power accumulated in the power source 3002 can be arbitrarily used. Therefore, for example, power is accumulated in the power source 3002 from the centralized electric power system 3022 at midnight when electricity charge is inexpensive, and the power accumulated in the power source 3002 can be used during the daytime when the electricity charge is expensive.

The power storage system described above may be installed in each house (for example, each household) or may be installed in every two or more houses (for example, two or more households).

Figure 8C:
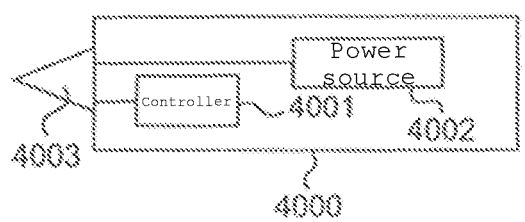
FIG. 8C is a block diagram showing a configuration of an electric tool to which the magnesium secondary battery is applied as an embodiment of the present technology.

Next, the application of the magnesium secondary battery to an electric tool will be described. FIG. 8C shows a block diagram showing a configuration of the electric tool. For example, the electric tool is an electric drill, and includes a controller 4001 and a power source 4002 inside a tool body 4000 made of a plastic material or the like. For example, a drill section 4003 which is a movable portion is rotatably attached to the tool body 4000. The controller 4001 controls operation of the entire electric tool (including a used state of the power source 4002), and includes a CPU, for example. The power source 4002 can include one or two or more magnesium secondary batteries (not shown) according to the present technology. The controller 4001 supplies electric power from the power source 4002 to the drill section 4003 in response to operation of an operation switch (not shown).

Although the embodiments of the present technology have been described above, those are merely typical examples. Therefore, the present technology is not limited to those embodiments, and those skilled in the art will readily understand that various aspects can be conceived without changing the gist of the present technology.

For example, the composition of the electrolytic solution, the raw materials used for manufacturing, the manufacturing method, and the manufacturing conditions, the characteristics of the electrolytic solution, and the configurations or structures of the electrochemical device and the battery, described above, are illustrative, are not limited thereto, and can be changed appropriately. A mixture of the electrolytic solution of the present technology and an organic polymer (for example, polyethylene oxide, polyacrylonitrile, and/or polyvinylidene fluoride (PVdF)) may also be used as a gel electrolyte.

EXAMPLES

The following verification test was conducted to confirm the effect of the present technology.

In particular, the verification test was conducted to determine whether the addition of the "cyclic organic compound having a two-dimensional structure or a three-dimensional structure" to an ether solvent containing a magnesium salt contributed to improving the characteristics of the magnesium electrode-based electrolytic solution.

Example 1

A magnesium-sulfur secondary battery having the following specifications was produced as an electrochemical device. Negative electrode: Electrode containing magnesium (Mg plate with φ15 mm and thickness of 200 μm/purity 99.9%, magnesium plate manufactured by Rikazai)

Positive electrode: Sulfur electrode (electrode containing 10% by mass of $S_8$ sulfur with product number 197-17892 manufactured by Wako Pure Chemical Industries, Ltd., Ketjen Black (KB) manufactured by Lion Corporation as a conductive aid, containing 65% by mass of product number ECP600JD, containing, as a binder, 25% by mass of polytetrafluoroethylene (PTFE) manufactured by Asahi Glass Company Ltd., product number CD-1E)

Figure 9:
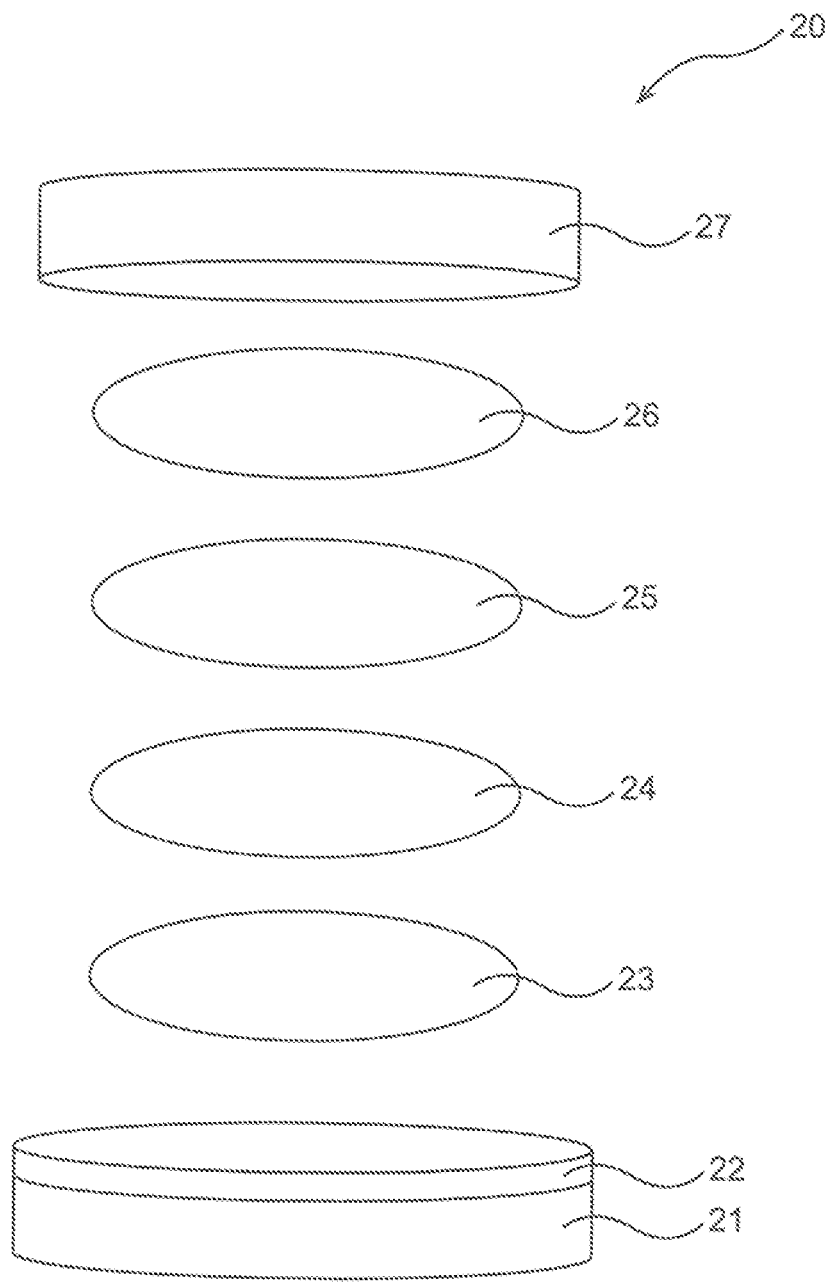
FIG. 9 is a development view schematically showing a battery produced in [Example] of the present disclosure.

Separator: Glass fiber (glass fiber manufactured by Advantec Co., Ltd., product number GC50)
Electrolytic solution
Magnesium salt: Halogen metal salt ($MgCl_2$ (anhydride): manufactured by Sigma-Aldrich Co., product number 449172, 0.8M) and imide metal salt (Mg(TFSI) 2: manufactured by Tomiyama Pure Chemical Industries, Ltd., product number MGTFSI, 0.8 M) Linear ether solvent: Diethylene glycol dimethyl ether (super-dehydrated product), (Tomiyama Pure Chemical Industries, Ltd., product number G2)
"Cyclic organic compound having two-dimensional structure or three-dimensional structure": Anthracene 0.01 M (manufactured by Tokyo Chemical Industry, product number A0495) Secondary battery form: Coin battery CR2016 type FIG. 9 shows a schematic development view of a produced battery. In a positive electrode 23, 10% by mass of sulfur ($S_8$), 60% by mass of Ketjenblack as a conductive aid, and 30% by mass of polytetrafluoroethylene (PTFE) as a binder were mixed using an agate mortar. Then, the resultant mixture was then rolled for about 10 times using a roller compactor while being softened with acetone. Then, the resultant was dried by vacuum drying at 70° C. for 12 hours. In this way, the positive electrode 23 could be obtained. A nickel mesh was used for a current collector and attached to the positive electrode.

A gasket 22 was placed on a coin battery can 21, on which a positive electrode 23 including sulfur, a glass fiber separator 24, a negative electrode 25 including a 200-μm-thick Mg plate having a diameter of 15 mm, a spacer 26 including a 0.5-mm-thick stainless-steel plate, and a coin battery lid 27 were stacked in this order and then sealed inside by crimping the coin battery can 21. The spacer 26 was previously spot-welded to the coin battery lid 27. The electrolytic solution was used in the form of being contained in the separator 24 of a coin battery 20.

The produced battery was charged and discharged. The charge and discharge conditions are as follows.
Discharge condition: CC discharge 0.1 mA/0.7 V cutoff
Charge condition: CC charge 0.1 mA/2.2 V cutoff
Temperature: 25° C.

Example 2

A magnesium-sulfur secondary battery was produced in the same manner as in Example 1 and was charged and discharged as in Example 1, except that 0.01 M of 9-bromoanthracene (manufactured by Tokyo Chemical Industry, product number B0872) was used instead of the anthracene used as the "cyclic organic compound having two-dimensional structure or three-dimensional structure" in Example 1.

Example 3

A magnesium-sulfur secondary battery was produced in the same manner as in Example 1 and was charged and discharged as in Example 1, except that 0.01 M of 9-phenylanthracene (manufactured by Tokyo Chemical Industry, product number P0138) was used instead of the anthracene used as the "cyclic organic compound having two-dimensional structure or three-dimensional structure" in Example 1.

Example 4

A magnesium-sulfur secondary battery was produced in the same manner as in Example 1 and was charged and discharged as in Example 1, except that 0.01 M of pentacene (manufactured by Tokyo Chemical Industry, product number P0030) was used instead of the anthracene used as the "cyclic organic compound having two-dimensional structure or three-dimensional structure" in Example 1.

Example 5

A magnesium-sulfur secondary battery was produced in the same manner as in Example 1 and was charged and discharged as in Example 1, except that 0.01 M of fullerene (manufactured by Sigma-Aldrich Co., product number 379646) was used instead of the anthracene used as the "cyclic organic compound having two-dimensional structure or three-dimensional structure" in Example 1.

Example 6

A magnesium-sulfur secondary battery was produced in the same manner as in Example 1 and was charged and discharged as in Example 1, except that ethylene glycol dimethyl ether (1,2-dimethoxyethane/DME, manufactured by Tomiyama Pure Chemical Industries, Ltd., product number DME) was used instead of the diethylene glycol dimethyl ether used as the "linear ether solvent" in Example 1.

Comparative Example 1

A magnesium-sulfur secondary battery was produced in the same manner as in Example 1 and was charged and discharged as in Example 1, except that the "cyclic organic compound (anthracene) having two-dimensional structure or three-dimensional structure" was not contained in the linear ether solvent of the electrolytic solution in Example 1.

Comparative Example 2

A magnesium-sulfur secondary battery was produced in the same manner as in Comparative Example 1 and was charged and discharged as in Comparative Example 1, except that ethylene glycol dimethyl ether (1,2-dimethoxyethane/DME, manufactured by Tomiyama Pure Chemical Industries, Ltd., product number DME) was used instead of the diethylene glycol dimethyl ether used as the "linear ether solvent" in Comparative Example 1.

Figure 10A:
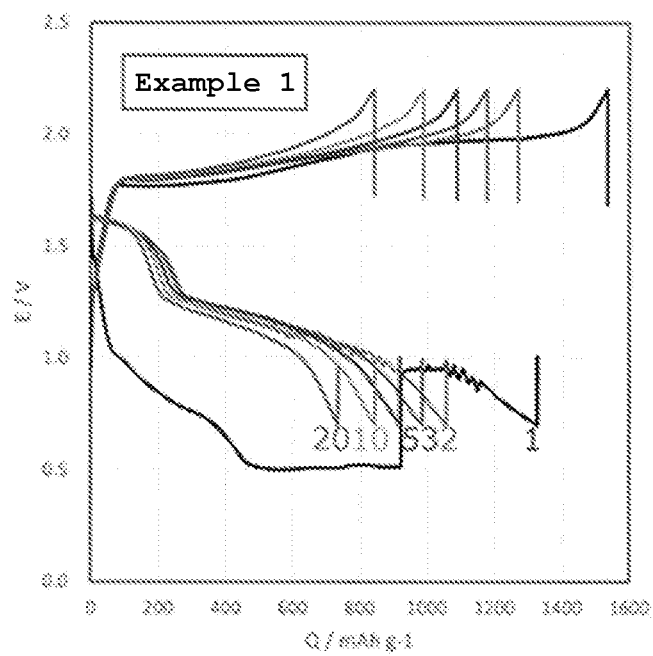
FIGS. 10(A) and 10(B) show a result of a charge/discharge curve obtained in [Example] of the present disclosure (FIG. 10(A): Example 1, FIG. 10(B): Comparative example 1).
Figure 10B:
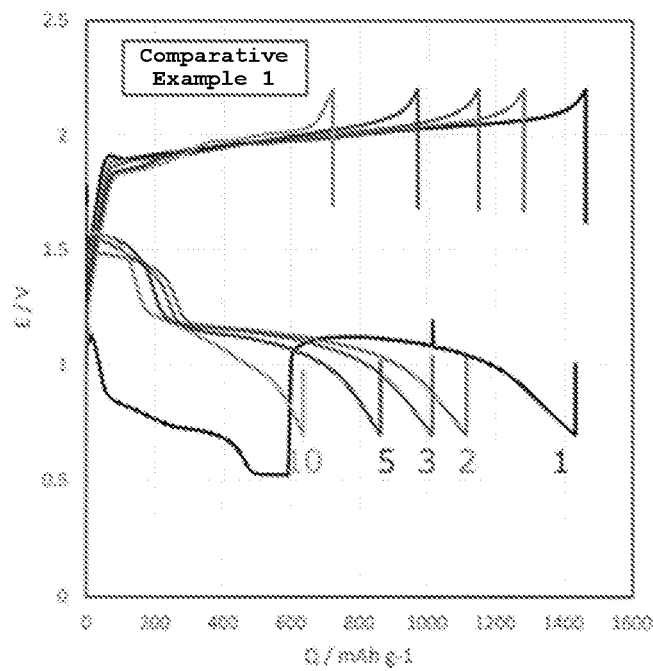
Figure 11:
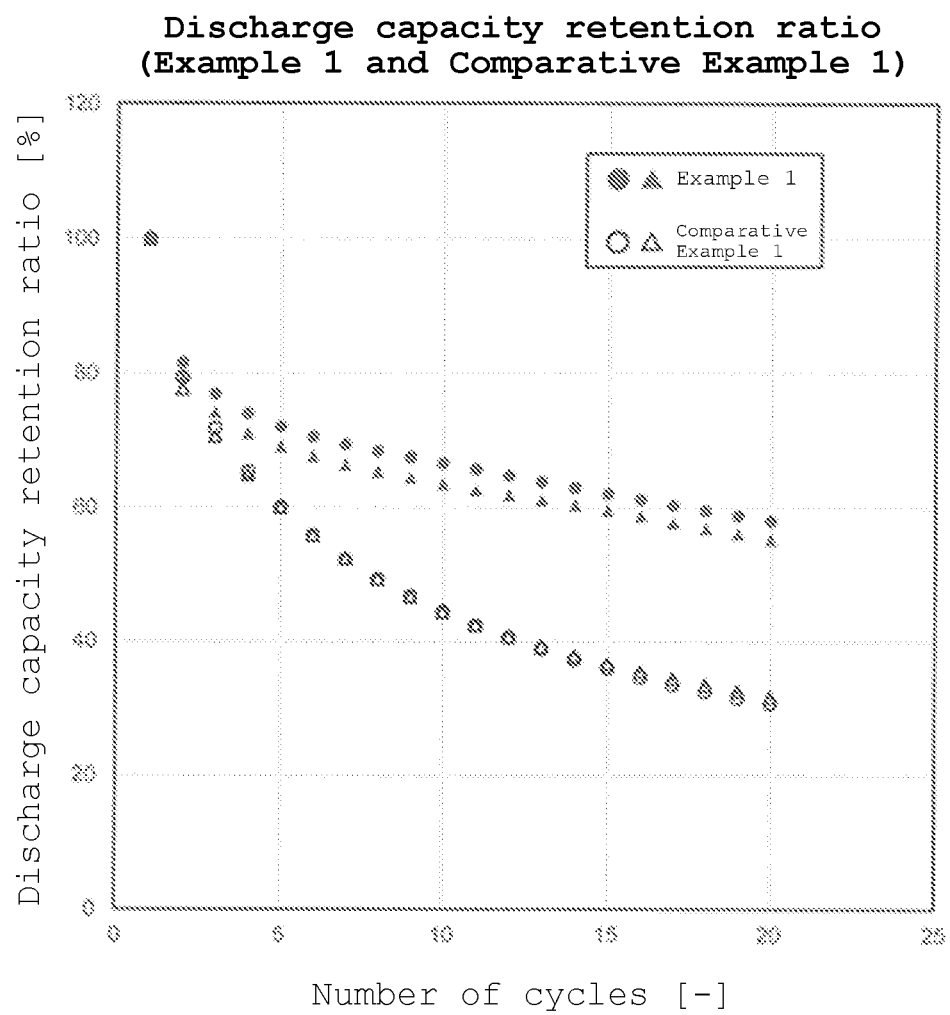
FIG. 11 shows a result of a discharge capacity retention ratio obtained in [Example] of the present disclosure (Example 1 and Comparative Example 1).
Figure 12:
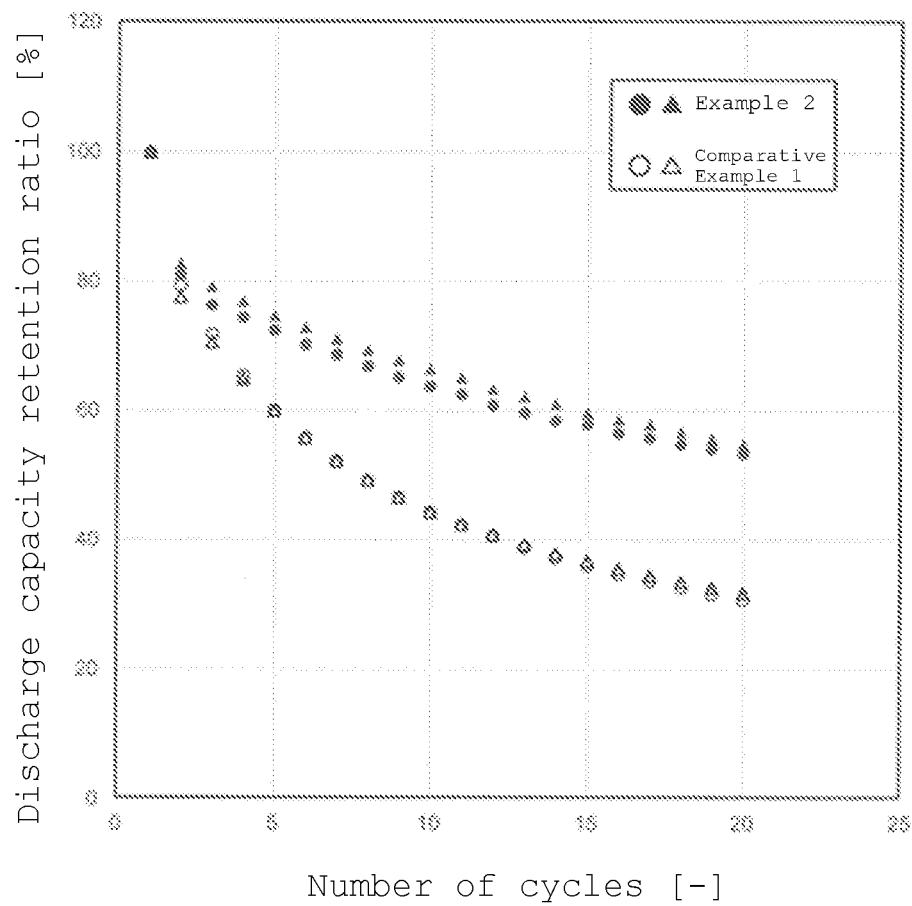
FIG. 12 shows a result of the discharge capacity retention ratio obtained in [Example] of the present disclosure (Example 2 and Comparative Example 1).
Figure 13:
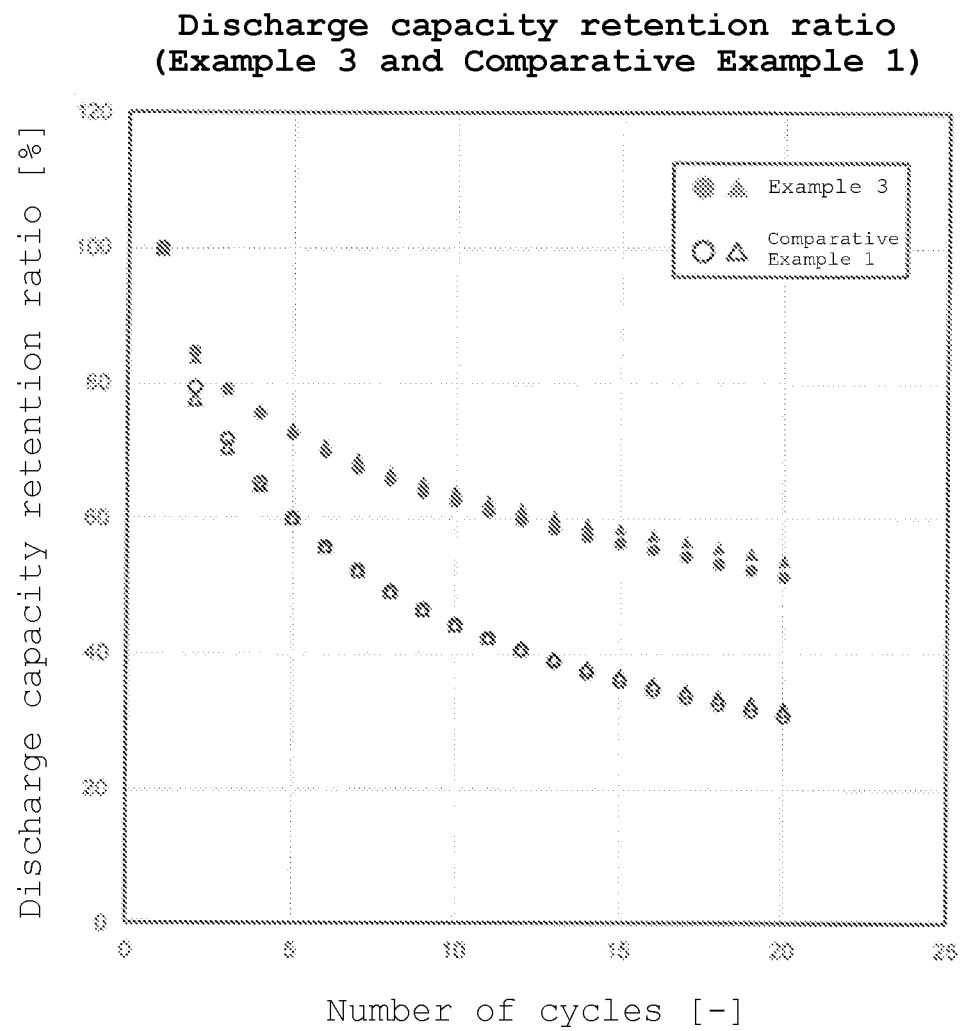
FIG. 13 shows a result of the discharge capacity retention ratio obtained in [Example] of the present disclosure (Example 3 and Comparative Example 1).
Figure 14:
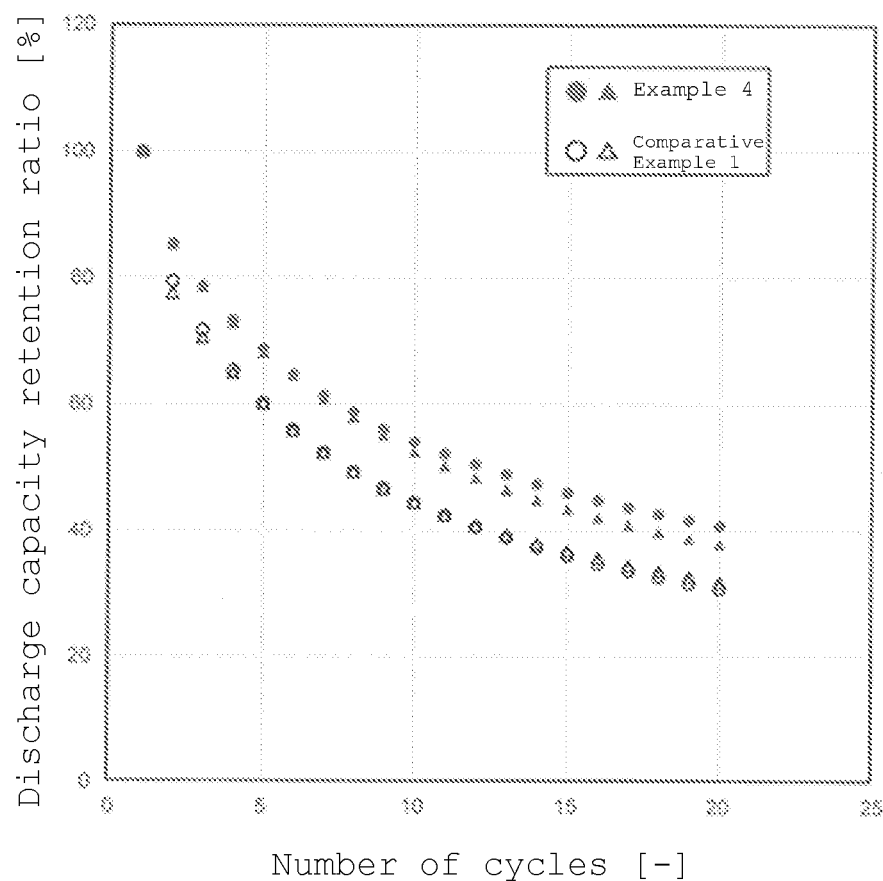
FIG. 14 shows a result of the discharge capacity retention ratio obtained in [Example] of the present disclosure (Example 4 and Comparative Example 1).
Figure 15:
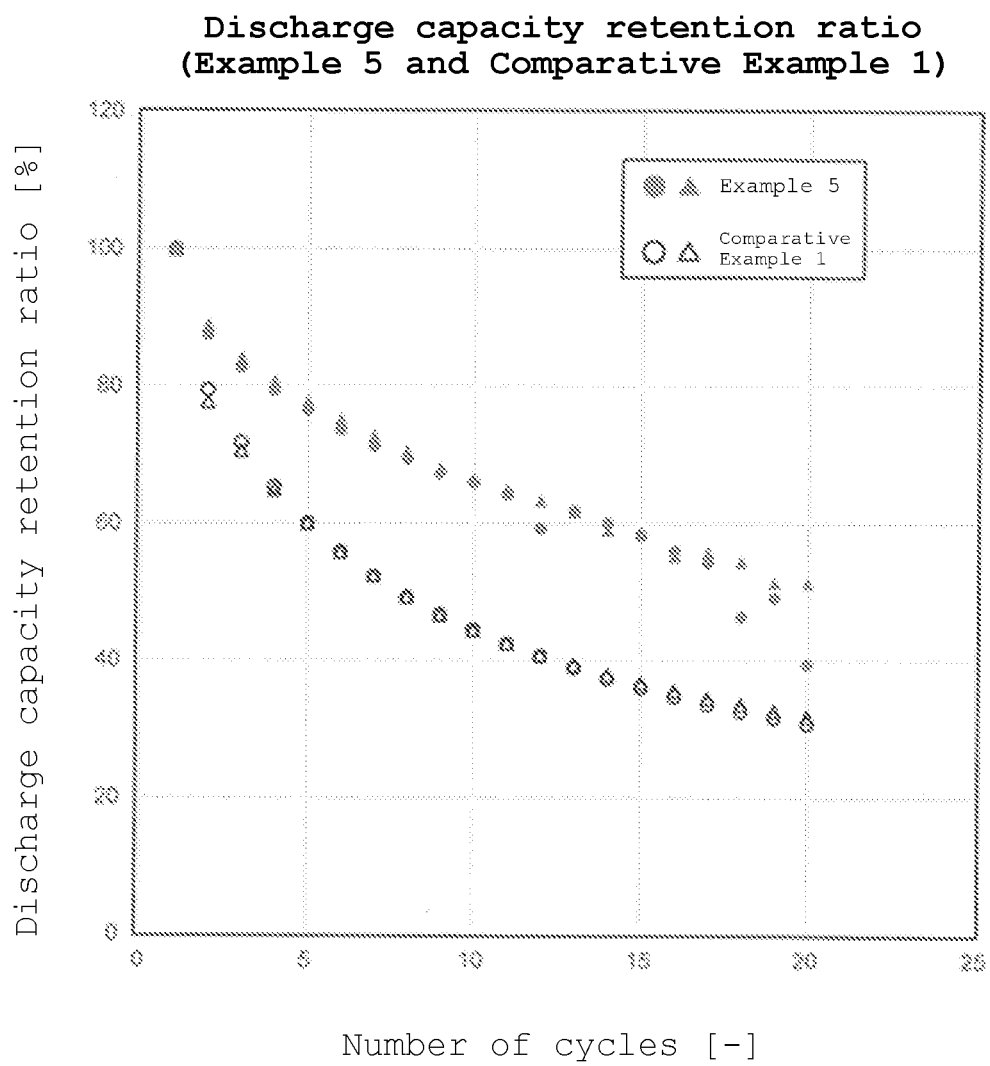
FIG. 15 shows a result of the discharge capacity retention ratio obtained in [Example] of the present disclosure (Example 5 and Comparative Example 1).
Figure 16:
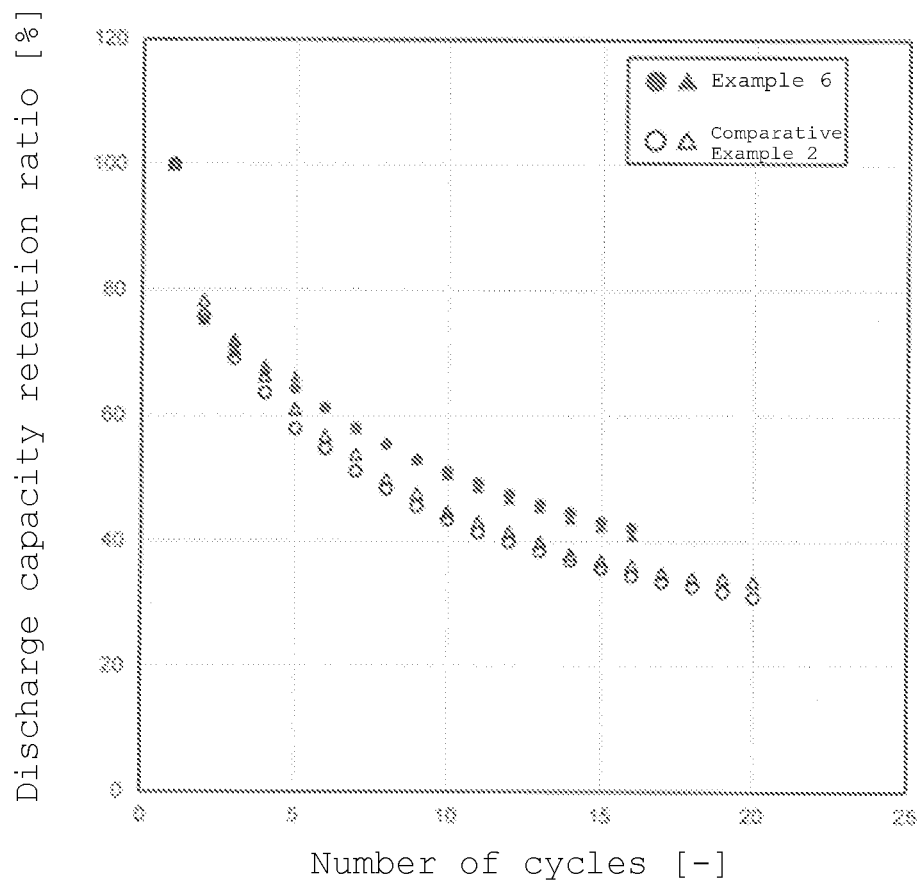
FIG. 16 shows a result of the discharge capacity retention ratio obtained in [Example] of the present disclosure (Example 6 and Comparative Example 2).
Figure 17:
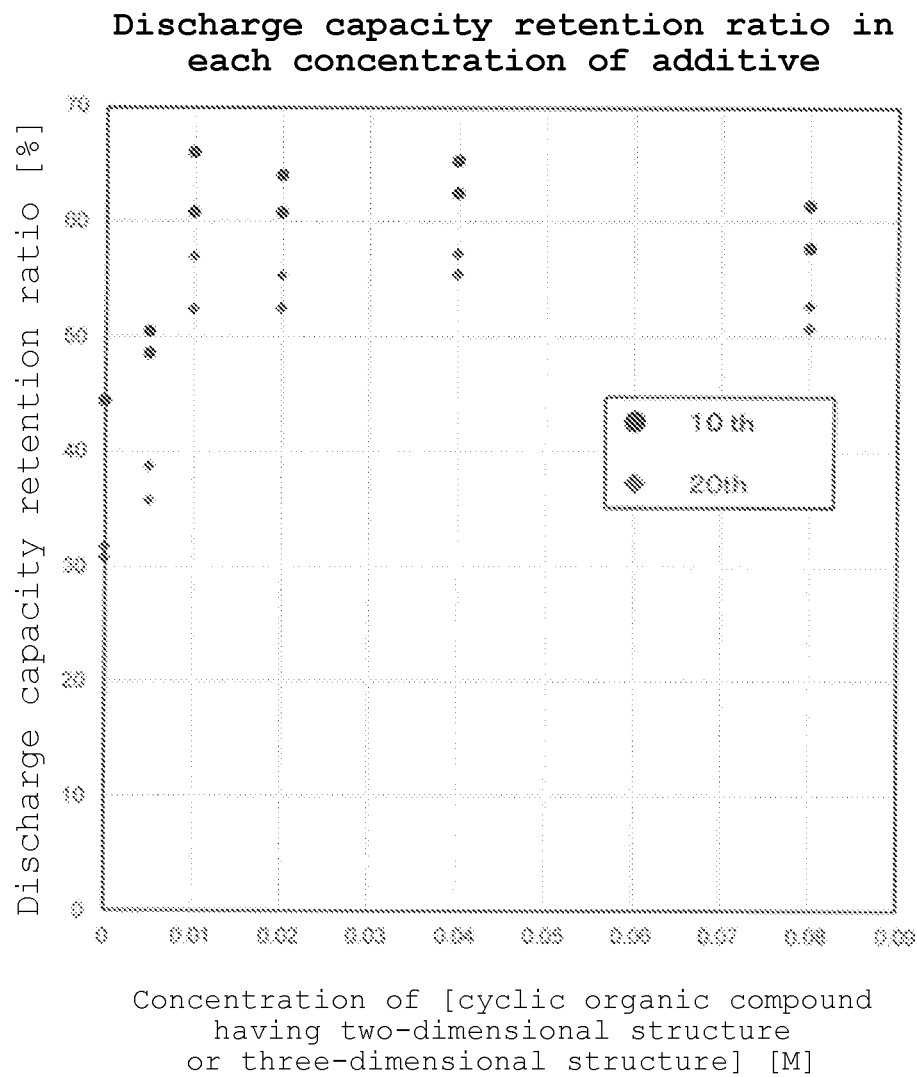
FIG. 17 shows a result of the discharge capacity retention ratio for each concentration of a "cyclic organic compound having a two-dimensional structure or a three-dimensional structure" obtained in [Example] of the present disclosure.

The results are shown in FIGS. 10(A) and 10(B), FIGS. 11 to 16 and 17. FIGS. 10(A) and 10(B) show charge/discharge curves in Example 1 and Comparative Example 1, respectively. FIGS. 11 to 16 show the capacity retention ratio with the number of cycles. FIG. 17 shows the discharge capacity retention ratio for each concentration of the "cyclic organic compound having two-dimensional structure or three-dimensional structure" in Example 1.

From the results of the charge/discharge curves in FIGS. 10(A) and 10(B), it was found that charge/discharge waveforms were almost the same in Example 1 and Comparative Example 1 and a two-stage plateau was shown in discharging. On the other hand, from the results of the capacity retention ratio with the number of cycles in FIGS. 11 to 16, it was found that a cycle retention ratio of the electrolytic solution containing the "cyclic organic compound having two-dimensional structure or three-dimensional structure" in the linear ether solvent was higher. In addition, from the results of FIG. 17, it was found that the higher cycle characteristics were achieved with a small content of the "cyclic organic compound having two-dimensional structure or three-dimensional structure", such as 0.1 M or less, especially 0.05 M or less, more specifically 0.01 M or less.

For this reason, it was found that by adding the "cyclic organic compound having a two-dimensional structure or a three-dimensional structure" to a linear ether solvent containing a magnesium salt, the cycle characteristics could be improved without impairing a discharge potential of the magnesium electrode-based electrochemical device (particularly magnesium-sulfur electrode-based electrochemical device). It was also found that such a "cyclic organic compound having a two-dimensional structure or a three-dimensional structure" might be added in a very small amount.

The electrolytic solution of the present technology can be used in various fields for extracting energy by utilizing an electrochemical reaction. Although it is merely an example, the electrolytic solution of the present technology is used not only for secondary batteries but also for various electrochemical devices such as capacitors, air batteries and fuel cells.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An electrolytic solution for an electrochemical device having an electrode including magnesium as a negative electrode, the electrolytic solution comprising:
a solvent including a linear ether; and
a magnesium salt included in the solvent,
wherein the solvent further includes a cyclic organic compound having a two-dimensional structure or a three-dimensional structure,
wherein a positive electrode of the electrochemical device is a sulfur electrode, and wherein the sulfur electrode is composed of elemental sulfur as an active ingredient as an active ingredient, a conductive aid, and a binder.

2. The electrolytic solution according to claim 1, wherein the cyclic organic compound includes a fused ring compound.

3. The electrolytic solution according to claim 2, wherein the number of rings in the fused ring compound is 3 to 6.

4. The electrolytic solution according to claim 2, wherein the fused ring compound includes an anthracene skeleton.

5. The electrolytic solution according to claim 1, wherein a content of the cyclic organic compound in the electrolytic solution is smaller than a content of the magnesium salt in the electrolytic solution.

6. The electrolytic solution according to claim 1, wherein the content of the cyclic organic compound in the electrolytic solution is 0.1 M or less.

7. The electrolytic solution according to claim 1, wherein the linear ether includes an ethyleneoxy structural unit represented by the chemical formula 1:

[Chemical Formula 1]

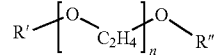

wherein R' and R" each independently represent a hydrocarbon group having 1 or more and 10 or less carbon atoms, and n is an integer from 1 to 10.

8. The electrolytic solution according to claim 7, wherein the n is an integer from 1 to 4, and the linear ether has one or more and four or less ethyleneoxy structural units.

9. The electrolytic solution according to claim 7, wherein the R' and the R" each independently represent a lower alkyl group having 1 or more and 4 or less carbon atoms.

10. The electrolytic solution according to claim 7, wherein the n is 2, and the linear ether has two ethyleneoxy structural units.

11. The electrolytic solution according to claim 1, further comprising a halogen metal salt as the magnesium salt.

12. The electrolytic solution according to claim 11, wherein the halogen metal salt includes magnesium chloride.

13. The electrolytic solution according to claim 11, further comprising an imide metal salt as the magnesium salt.

14. An electrochemical device comprising:
a negative electrode, an electrolytic solution, and a positive electrode,
wherein the negative electrode includes magnesium,
wherein the electrolytic solution includes a solvent including a linear ether, and a magnesium salt included in the solvent, wherein the solvent further includes a cyclic organic compound having a two-dimensional structure or a three-dimensional structure, and
wherein the positive electrode is a sulfur electrode, and wherein the sulfur electrode is composed of elemental sulfur as an active ingredient as an active ingredient, a conductive aid, and a binder.

15. The electrolytic solution according to claim 1, wherein the sulfur electrode is composed of $S_8$ sulfur as the active ingredient, a carbon material as the conductive aid, and a fluorine-containing resin as the binder.

16. The electrochemical device according to claim 14, wherein the sulfur electrode is composed of $S_8$ sulfur as the active ingredient, a carbon material as the conductive aid, and a fluorine-containing resin as the binder.

* * * * *